US007936329B2

(12) United States Patent
Iriguchi et al.

(10) Patent No.: US 7,936,329 B2
(45) Date of Patent: May 3, 2011

(54) ACTIVE MATRIX TYPE DISPLAY DEVICE AND DRIVING METHOD THEREOF

(75) Inventors: Masao Iriguchi, Tokyo (JP); Hiroshi Tsuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 1139 days.

(21) Appl. No.: 11/411,048

(22) Filed: Apr. 26, 2006

(65) Prior Publication Data

US 2006/0244710 A1 Nov. 2, 2006

(30) Foreign Application Priority Data

Apr. 27, 2005 (JP) ................................ 2005-129915

(51) Int. Cl.
*G09G 3/36* (2006.01)
*G06F 3/038* (2006.01)

(52) U.S. Cl. ............. 345/99; 345/98; 345/100; 345/213

(58) Field of Classification Search ............ 345/98–100, 345/213
See application file for complete search history.

(56) References Cited

U.S. PATENT DOCUMENTS

| | | | | |
|---|---|---|---|---|
| 6,191,769 | B1 * | 2/2001 | Fujiwara et al. | 345/99 |
| 6,407,729 | B1 * | 6/2002 | Moon | 345/99 |
| 6,448,836 | B2 * | 9/2002 | Kokubun et al. | 327/307 |
| 6,946,905 | B2 * | 9/2005 | Kokubun et al. | 330/9 |

(Continued)

FOREIGN PATENT DOCUMENTS

CN 1534586 A 10/2004

(Continued)

OTHER PUBLICATIONS

Tomio Chiba, et al. "CMOS Switched-Capacitor Operational Amplifier With Auto-Zero Offset Compensation," Technical Report, CAS83-82, 1983.

*Primary Examiner* — Amr Awad
*Assistant Examiner* — Waseem Moorad
(74) *Attorney, Agent, or Firm* — Sughrue Mion, PLLC

(57) ABSTRACT

Disclosed is a display device including display unit, a column driver, a delay control circuit, an output switch control circuit, and a display controller. The display unit includes a plurality of pixel electrodes arranged at intersections between a plurality of data lines and a plurality of scan lines in a matrix form and TFTs. One of a drain and a source of each of the TFTs is connected to a corresponding one of the pixel electrodes. The other one of the drain and the source of each of the TFTs is connected to a corresponding one of the data lines, and a gate of each of the TFTs is connected to a corresponding one of the scan lines. The scan driver supplies a scan signal to each of the scan line in a preset scan cycle. The column driver includes D/A converter circuits for converting video data to gray scale signals, a plurality of buffer amplifiers for sequentially amplifying and outputting the gray scale signals in a preset output cycle, and an output switch circuit including a plurality of switches connected to output terminals of the buffer amplifiers and the data lines, respectively. The delay control circuit controls the scan driver so that the preset scan cycle is delayed from the preset output cycle just by a preset delay time. The output switch control circuit controls the output switch circuit to be kept off during the preset delay time. The display controller controls the video data, scan driver, column driver, delay control circuit, and output switch control circuit, respectively.

16 Claims, 19 Drawing Sheets

U.S. PATENT DOCUMENTS 7,239,300 B2 * 7/2007 Shimizu ........................ 345/100
2005/0190127 A1 * 9/2005 Tomohara ....................... 345/76

FOREIGN PATENT DOCUMENTS

JP 58-99033 A 6/1983
JP 58-121831 A 7/1983
JP 61-214815 A 9/1986
JP 6-326529 A 11/1994
JP 9-244590 A 9/1997
JP 11-95729 A 4/1999
JP 11-249624 A 9/1999
JP 2001-22328 A 1/2001
JP 2003-162263 A 6/2003
JP 2004-61970 A 2/2004
JP 2004-318170 A 11/2004

* cited by examiner

TD; OUTPUT SWITCH OFF PERIOD
TON; OUTPUT SWITCH ON PERIOD
TDATA; ONE OUTPUT PERIOD
TSCAN; ONE SCAN SELECTION PERIOD

FIG . 12A

WAVEFORM AT NEAR END OF LOAD

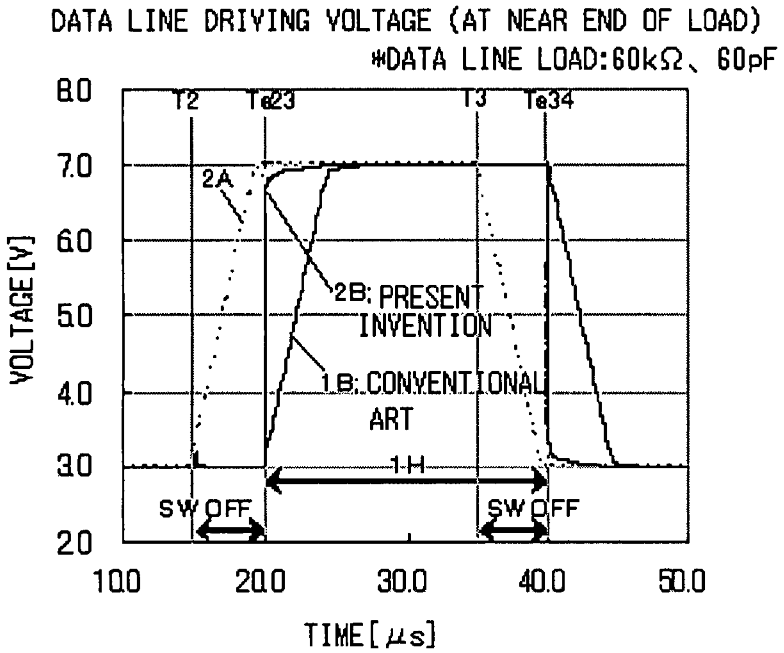

2A;OUTPUT VOLTAGE OF OPERATIONAL AMPLIFIER IN THE PRESENT INVENTION

2B;DATA LINE DRIVING VOLTAGE (AT NEAR END OF LOAD) IN THE PRESENT INVENTION

1B; DATA LINE DRIVING VOLTAGE (AT NEAR END OF LOAD) IN CONVENTIONAL DRIVING METHOD

FIG . 12B

WAVEFORM AT FAR END OF LOAD

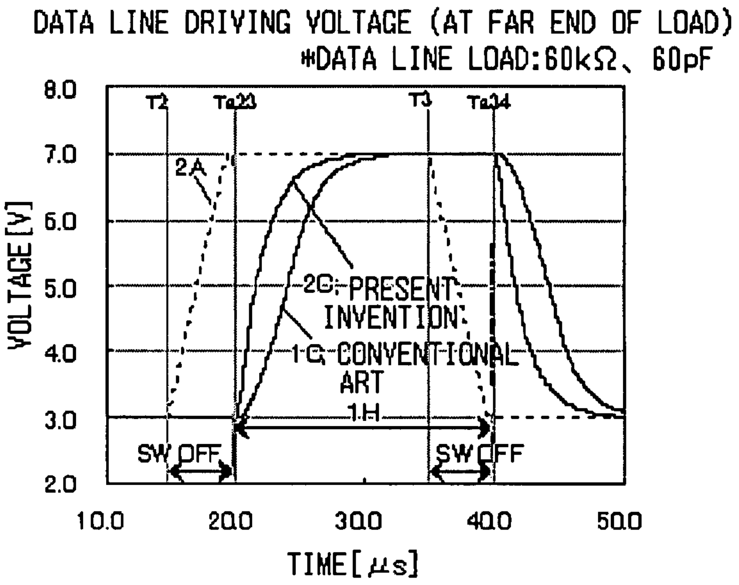

2A;OUTPUT VOLTAGE OF OPERATIONAL AMPLIFIER IN THE PRESENT INVENTION

2C;DATA LINE DRIVING VOLTAGE (AT FAR END OF LOAD) IN THE PRESENT INVENTION

1C;DATA LINE DRIVING VOLTAGE (AT FAR END OF LOAD) IN CONVENTIONAL DRIVING METHOD

WA; DATA LINE DRIVING VOLTAGE AT NEAR END OF LOAD
WB; DATA LINE DRIVING VOLTAGE AT FAR END OF LOAD
WC; PIXEL ELECTRODE HOLDING VOLTAGE AT FAR END OF LOAD
TA; RISE DELAY TIME AT NEAR END OF LOAD
TB; RISE DELAY TIME AT FAR END OF LOAD
TC; RISE DELAY TIME OF PIXEL ELECTRODE VOLTAGE
Tr; RISE TIMING OF SCAN SIGNAL

ACTIVE MATRIX TYPE DISPLAY DEVICE AND DRIVING METHOD THEREOF

FIELD OF THE INVENTION

The present invention relates to an active matrix type display device and a driving method thereof. More specifically, the invention relates to a display device including circuit means suitable for driving a data line with a large-capacitance load and a driving method thereof.

BACKGROUND OF THE INVENTION

Liquid crystal display devices (LCDs) characterized by their thin design, light weight and low power consumption have come into widespread use in recent years and are utilized in the display units of mobile devices such as portable telephones (mobile telephones or cellular telephones), PDAs (Personal Digital Assistants) and laptop personal computers. A system for driving these liquid crystal display devices is classified into a simple matrix type and an active matrix type. It is the active matrix type that is suitable for achieving higher definition. The active matrix type display device has a switching device for each pixel.

Since the active matrix type display system has a thin film transistor (Thin Film Transistor: hereinafter abbreviated as a "TFT") as the switching device for controlling an individual pixel, image display with high quality is possible, thus being suited to achieving the higher definition. A configuration of a conventional active matrix type liquid crystal display device and a driving method of the conventional active matrix type liquid crystal display device will be shown below.

FIG. 14 is a diagram showing an example of a typical configuration of the conventional active matrix type liquid crystal display device. Referring to FIG. 14, this active matrix type liquid crystal display device includes a liquid crystal panel 101, a scan driver, a column driver 109, and a display controller 120. The liquid crystal panel 101 has two substrates and a liquid crystal sandwiched between these two substrates. On one substrate, a plurality of data lines 102 are arranged in a vertical direction of the drawing, a plurality of scan lines 103 are respectively arranged in a horizontal direction of the drawing, and pixel circuits 104 are laid out at intersections between the data lines 102 and the scan lines 103 laid in the form of a matrix. On the other substrate, a common electrode 110 is provided for the entire surface of the other substrate, and a predetermined voltage is given to this common electrode 110.

The pixel circuit 104 shown in FIG. 14 corresponds to a circuit equivalent to one liquid crystal display element. The pixel circuit 104 includes a TFT 105, a pixel electrode 117, a liquid crystal capacitance 106, and a storage capacitance 107. The TFT 105 is connected between a data line 102 and the pixel electrode 117, and a control terminal thereof is connected to a scan line 103. The liquid crystal capacitance 106 and the storage capacitance 107 are connected between the pixel electrode 117 and the common electrode 110. When the TFT 105 is turned on according to a scan signal on the scan line 103, a gray scale signal on the data line 102 is supplied to the pixel electrode 117. When the TFT 105 is turned off, the gray scale signal is held by the liquid crystal capacitance 106 and the storage capacitance 107. Since the transmittance of the liquid crystal changes according to a potential difference between the pixel electrode 117 and the common electrode 110, gray scale display of the liquid crystal can be performed by supplying the voltage of the gray scale signal to the pixel electrode.

FIG. 15 is a diagram showing an example of a typical configuration of the conventional column driver 109 used in the device shown in FIG. 14. Referring to FIG. 15, the column driver 109 includes a shift register 208, a data register 207, a data latch 206, a level shifter 205, a gray scale voltage generation circuit 204, digital-to-analog converter circuits 202, and buffer amplifiers 201. The buffer amplifiers 201 include voltage-follower type operational amplifiers 112.

An operation of the column driver 109 shown in FIG. 15 will be described. The shift register 208 outputs a shift pulse according to a clock signal CLK. The data register 207 sequentially shifts up input video data responsive to the shift pulse output from the shift register 208 and distributes the video data according to the number of outputs of shift pulses. The data latch 206 temporarily holds the video data distributed from the data register 207, and outputs to the level shifter 205 entire outputs thereof in unison responsive to a timing of a control signal STB.

The level shifter 205 converts the voltage amplitude of the video data to the voltage amplitude corresponding to a liquid crystal driving voltage, for output to the digital-to-analog converter circuits (D/A converter circuits) 202.

The D/A converter circuits 202 receive a plurality of gray scale voltages output from the gray scale voltage generation circuit 204, select gray scale voltages based on the video data, and output the gray scale voltages as gray scale signals.

The buffer amplifier 201 includes the operational amplifiers 112 corresponding to the number of the outputs thereof. The buffer amplifier 201 receives the gray scale signals output from the D/A converter circuits 202, and output to output terminals 810 the gray scale signals that have been current amplified. The output terminals 810 of the column driver 109 (See FIG. 14) are connected to corresponding one ends of the data lines 102.

Next, a method of driving the conventional active matrix type liquid crystal display device shown in FIG. 14 will be described. FIG. 16 is a diagram showing a timing chart of typical signals for driving the conventional active matrix type liquid crystal display device described with reference to FIGS. 14 and 15. Referring to FIGS. 14 and 15 and timing waveforms in FIG. 16, the method of driving the conventional active matrix type liquid crystal display device will be described below.

FIG. 16 shows a control signal STB, video data DATA (x−1), DATA (x), and DATA (x+1) associated with one data line, scan signals Y (x−1), Y (x), and Y (x+1), and a driving voltage waveform for the one data line.

The video data DATA (x) and DATA (x+1) show data signals output from the data latch 206 (refer to FIG. 15), and are output to the level shifter 205 (refer to FIG. 15) responsive to rise timings T1 and T2 of the control signal STB.

Accordingly, gray scale signals corresponding to the video data DATA (x), DATA (x+1) are also output from an operational amplifier 112 (refer to FIG. 15) at substantially the same times as the timings T1 and T2, thereby driving the data line.

On the other hand, the scan signals Y (x) and Y (x+1) show the scan signals on the adjacent scan lines. The scan signal Y (x) is kept HIGH from the timing T1 to the T2 and kept LOW otherwise. The scan signal Y (x) is driven from the timing T1 to T2. Then, the TFTs for one row connected to the scan line are turned on, and the gray scale signal output to each of the data lines is supplied to each pixel electrode of the pixel circuits for the one row.

The scan signal Y (x+1) is kept HIGH from the timing T2 to a timing T3 and kept LOW otherwise. From the timing T2 to the timing T3, the gray scale signal output to each of the data lines is supplied to each pixel electrode of the pixel circuits for the next row.

As a data line driving voltage, the gray scale signal corresponding to the video data DATA (x) and the gray scale signal corresponding to the video data DATA (x+1) are driven during a period from the timing Ti to the T2 and from a period the timing T2 to the timing T3, respectively, and are supplied to the pixel electrodes of the pixel circuits that are adjacent to each other in the vertical direction in response to the scan signals Y (x) and Y (x+1).

The data line driving voltage in FIG. 16 is in the form of the gray scale signal with a negative polarity (−) during the period from the timing T1 to the timing T2. Then, during the period from the timing T2 to the timing T3, the data line driving voltage is in the form of the gray scale signal with a positive polarity (+). The polarity of the gray scale signal is defined with reference to a voltage VCOM of the common electrode 110.

When the polarity is changed as described above, a polarity inversion is performed for each pixel row. This is a common method of enhancing display quality of the liquid crystal panel.

Further, assume that it is set so that the polarities of the gray scale signals output to the adjacent data lines at the same timing become different, though the setting is not shown in FIG. 16. Then, a polarity change is performed for each pixel column. This is also the common method of enhancing the display quality of the liquid crystal panel.

Further, supply and holding of the gray scale signal to each pixel electrode is repeated for each frame period, and every time the supply and holding is performed, the polarity of the gray scale signal is reversed. This is a common liquid crystal driving method of preventing liquid crystal deterioration.

The foregoing description was given about driving of one data line associated with the video data DATA (x) or DATA (x+1) and supply of the gray scale signal to the pixel electrodes, by referring to FIG. 16. The same holds true for other data lines.

Next, the data line driving voltage supplied to each of the pixel circuits 104 in the display panel 101 in FIG. 14 will be described in detail.

FIG. 17 is a diagram showing an equivalent circuit 113 for one data line 102 and one pixel circuit 104. Incidentally, in the equivalent circuit 113 for the data line in FIG. 17, one end of the data line to which an output terminal 810 of the column driver is connected is indicated by a terminal NN1 (referred to as a "data line near end") and the other end of the data line is indicated by a terminal FF1 (referred to as a "data line far end").

Generally, an equivalent circuit for wiring can be represented by a configuration in which a resistance element and a capacitance element are connected in a plurality of stages, as shown in FIG. 17. Each resistance element is determined by the material of the wiring, the length of the wiring, and the sectional area of the wiring that constitute the data line. Each capacitance element is determined by a configuration of each pixel circuit such as the capacitance of the liquid crystal between the data line and the common electrode 110 and the capacitance at the intersection between the data line with a corresponding scan line.

Accordingly, as a screen of the display panel 101 becomes larger, and as a resolution of the display panel 101 becomes higher, an impedance of the data line is increased. On the other hand, only the one pixel circuit 104 connected to the data line far end FF1 is shown, and other pixel circuit is omitted. The configuration of the pixel circuit 104 is as described by referring to FIG. 14.

FIG. 13 shows voltage waveforms WA, WB, and WC of the data line near end NN1, the data line far end FF1, and the pixel electrode 117 in FIG. 17, respectively. Each of the voltage waveforms WA, WB, and WC shows a change before and after the timing T2 of the timing chart in FIG. 16 (which means that Tr=T2 in FIG. 13).

Referring to FIG. 13, the voltage waveform WA (voltage waveform at the data line near end NN1 in FIG. 17) undergoes a voltage change at a constant slew rate after the timing T2, and reaches a target gray scale signal voltage after a timing TA. This slew rate is determined by driving capability of the operational amplifier 112 in FIG. 15.

After the timing T2, the voltage waveform WB (voltage waveform at the data line far end FF1) gently changes, and reaches the target gray scale signal voltage after a timing TB.

The change of the voltage waveform WB at this point is determined by a rate of relaxation within the data line in which electric charges supplied to the data line near end NN1 depend on the impedance of the data line. That is, the voltage waveform WB is determined by the voltage waveform WA and the impedance of the data line.

The voltage waveform WC (voltage waveform at the pixel electrode 117) changes more slowly than the voltage waveform WB after the timing T2, and reaches the target gray scale signal voltage after a time TC. The change of the voltage waveform WC depends on the voltage waveform WB and the mobility of an electric charge in the TFT 105 because the voltage waveform WB is transmitted through the TFT 105.

Currently, in the common liquid crystal display device, the TFT 105 of the liquid crystal panel 101 is formed of amorphous silicon. Since the mobility of an electric charge of the amorphous silicon TFT is comparatively low, the voltage waveform WC becomes a waveform with a delay further larger than that of the voltage waveform WB.

Accordingly, a period 1H for driving the gray scale signal corresponding to one video data (corresponding to an interval between the timing T1 and the timing T2, and between the timing T2 and the timing T3 in FIG. 16) in the timing chart of FIG. 16 is set based on the time TC (rise delay time of a pixel electrode, see FIG. 13).

In order to reduce the time TC, it is required that the liquid crystal panel 101 should be so configured that the impedances of the data line 102 and the TFT 105 become low or that the driving capability of the operational amplifier 112 should be enhanced in the column driver and the slew rate of the voltage waveform WA should be increased.

A method of reducing a rise time of the data line driving voltage without increasing the current driving capability of the operational amplifier is described in Patent Document 1 (Japanese Patent Kokai Publication No. JP-P2001-22328A), for example. In Patent Document 1, in order to reduce the impedances, two measures are taken after a configuration shown in FIG. 18 has been made. That is, within a precharging period, 1) connection that reduces a delay time of a decoder output (time for stabilizing the output of a decoder circuit) is performed, and
2) a predetermined potential is set for the data line in advance by precharging.

Decoder circuits 278 and 279, are disconnected from amplifier circuits 271 and 272 within the precharging period. Transfer gate circuits TG31 and TG32 in an off state are connected to outputs of the decoder circuits. Since input impedances of the transfer gate circuits TG31 and TG32 are far smaller than those of the amplifier circuits 271 and 272, delay times of the outputs of the decoder circuits can be reduced. At the same time, by supplying precharge voltages (VHpre, VLpre) to inputs of the amplifier circuits 271 and 272, respectively, drain lines are precharged. A higher-speed operation is thereby achieved.

In such a configuration, enhancing the current driving capability of the operational amplifier becomes unneeded. However, compared with the configuration of the conventional display device, a precharge control circuit constituted from the transfer gate circuits TG31 to TG34 is newly required. Supply of a predetermined voltage by precharging thereby becomes necessary.

Further, in this configuration, charging and discharging times required for obtaining a voltage from the precharging potential to a target gray scale voltage becomes necessary.

As another method of reducing the rise time of the data line driving voltage, a method of raising a video signal within a portion of a reset period is described in Patent Document 2 (Japanese Patent Kokai Publication No. JP-P2004-61970A), for example. Referring to Patent Document 4, an organic EL (Electro Luminescence) display device is taken as an example, and control is performed according to a timing chart as shown in FIG. 19. An organic EL display element emits light according to an amount of a supplied current. Thus, variation in the amount of the supplied current that depends on a TFT degrades display quality. For this reason, it is usually a common practice to provide the reset period within a horizontal blanking period (period from the end of supplying a video signal by sweeping a line to the start of sweeping a next line), which is a start period of a horizontal period, and apply a correction signal to pixels.

However, due to the higher definition, the horizontal period is reduced, and the horizontal blanking period is also reduced. Thus, it becomes difficult to perform resetting in this period.

Then, by providing the reset period that is overlapped with a horizontal scan period (period from supply of a video signal voltage to a data line from wiring for supplying a video signal), and causing the video signal on the wiring for supplying the video signal to reach a set potential in advance in a period in which the wiring for supplying the video signal and the data line are disconnected, the rise time of the data line driving voltage after completion of the reset period can be reduced.

However, the above described configuration is the method of securing the reset period, and does not solve shortage of a time for supplying the voltage to the pixel electrodes. It is because the time for supplying the voltage to the pixels in the configuration described before is the time obtained by subtracting from the horizontal period the horizontal blanking period and a portion of the horizontal scan period (period overlapped with the reset period).

The two Patent Documents described above are examples in which the configuration of a data line driver circuit in the display device and a control method of the data line driver circuit have been changed.

In addition to the above documents, Patent Documents and Non-patent Documents that will be described below are referred to as literatures related to the invention disclosed in the specification of the present application. Incidentally, in addition to the Patent Document 1, Patent Document 6, Patent Document 10, and Patent Document 11 disclose a configuration in which a switch is provided between an amplifier for data line driving and a data line.

[Patent Document 1]
Japanese Patent Kokai Publication No. JP-P2001-22328A
[Patent Document 2]
Japanese Patent Kokai Publication No. JP-P2004-61970A
[Patent Document 3]
Japanese Patent Kokai Publication No. JP-A-58-099033
[Patent Document 4]
Japanese Patent Kokai Publication No. JP-A-58-121831
[Patent Document 5]
Japanese Patent Kokai Publication No. JP-A-61-214815
[Patent Document 6]
Japanese Patent Kokai Publication No. JP-A-11-095729
[Patent Document 7]
Japanese Patent Kokai Publication No. JP-A-11-249624
[Patent Document 8]
Japanese Patent Kokai Publication No. JP-A-6-326529
[Patent Document 9]
Japanese Patent Kokai Publication No. JP-A-9-244590
[Patent Document 10]
Japanese Patent Kokai Publication No. JP-P2003-162263A
[Patent Document 11]
Japanese Patent Kokai Publication No. JP-P2004-318170A
[Non-patent Document 11]
Technical Report, CAS83-82, p. 7, "CMOS Switched-Capacitor Operational Amplifier with Auto-zero Offset Compensation", 1983

SUMMARY OF THE DISCLOSURE

In recent years, higher definition and an increased dimension of the liquid crystal display panel has been achieved, and a resolution standard evolves from XGA (resolution of 1024 horizontal pixels and 768 vertical pixels), SXGA (resolution of 1280 horizontal pixels and 1024 vertical pixels), and then UXGA (resolution of 1600 horizontal pixels and 1200 vertical pixels). Thus, the number of pixels becomes vast, and the impedance of the data line has been increased.

Further, it is a common practice to set a frame frequency to 60 Hz or more (with the frame period being 16.7 ms or less) irrespective of the definition and size of the screen. Then, the length of one horizontal period (abbreviated as "1H") is determined depending on the size and the definition level of the screen. Accordingly, 1H is reduced due to the higher definition, and it becomes difficult to secure a time for supplying the voltage to the pixel electrodes within 1H (time TC in FIG. 13).

As a result, the gray scale signal voltage to be supplied to the pixel electrodes does not adequately reach the target voltage, so that the display quality degrades.

On contrast therewith, as described with reference to FIG. 13, in order to reduce the time TC for supplying the voltage to the pixel electrodes within 1H, it becomes necessary to configure the panel so that the impedances of the data line and the TFTs become low, or to use a column driver with the operational amplifiers 112 having the high driving capability.

However, it is not easy to change the configuration of the panel. For this reason, generally, by increasing the driving capabilities of the operational amplifiers 112 in the column driver, the requirement is addressed.

In order to increase the driving capabilities of the operational amplifiers 112 in the column driver, or to obtain a higher slew rate, it is necessary to increase power consumption of the operational amplifiers 112. In order to achieve the higher slew rate for the liquid crystal panel with a large screen and a higher resolution, in particular, current consumption of the operational amplifiers 112 must be remarkably increased.

A sharp increase in the current consumption of the operational amplifiers 112 leads to an increase in the current consumption of the column driver and the entire display device and heat generation of the display device.

That is, a problem arises that the time for supplying the voltage to the pixel electrodes in the large-screen, high-resolution liquid crystal panel becomes insufficient.

Further, when improvement of this problem is tried, a problem also arises that power consumption of the column driver and the display device increases.

Accordingly, it is an object of the present invention to improve an active matrix type display device and a driving method therefor, and a column driver of the display device of which driving capability of a gray scale signal voltage is improved and display quality is high, without increasing driving capability of an output buffer, for an increase in a data line impedance (or a resistance of wiring and a capacitance of the wiring) caused by a larger screen of the display device and a higher resolution of the display device.

The invention disclosed in the present application is generally configured as follows as means for solution to the problems. Numerals and symbols within brackets in the following configurations indicate the numerals and symbols of corresponding components in embodiments of the invention. They are used only for the sake of clarifying corresponding relationships thereof, and are not provided for limiting the present invention.

A device according to the present invention is a display device that includes a buffer amplifier for driving a signal line responsive to an input signal and supplies a signal from the signal line to a pixel selected by a scan signal. The display device includes a switch between an output of the buffer amplifier and the signal line. When the signal is supplied to the pixel, the display device performs control so that the switch is turned off for a predetermined period and turned on after the period, and then driving of the signal line by the output of the buffer amplifier is started. While the switch is set in an off state during the period, the output of the buffer amplifier reaches to a level corresponding to the input signal. Preferably, in the present invention, the selected scan signal is activated after the period. In the present invention, the signal line constitutes a capacitive load. Before completion of a period in which the signal on the signal line is supplied to the pixel, the switch is turned off, and driving of the signal line through the buffer amplifier is stopped. Then, electric charges held on the signal line during that period are supplied to the pixel.

An active matrix type display device according to one aspect (aspect) of the present invention includes:

a display unit (101) including:

a plurality of data lines (102) extending parallel to one another in one direction;

a plurality of scan lines (103) extending parallel to one another in a direction orthogonal to said one direction;

a plurality of pixel electrodes (117) arranged in a matrix pattern at points of intersection of said data lines (102) and said scan lines (103); and a plurality of thin-film transistors (TFTs) (105) each provided for each of the pixel electrodes (117), one of a drain and a source of each of the TFTs being connected to a corresponding one of the pixel electrodes (117), the other one of the drain and the source of the each of the TFTs being connected to a corresponding one of the data lines (102), a gate of the each of the TFTs being connected to a corresponding one of the scan lines (103);

a scan driver (108) for supplying a scan signal to each of the scan lines (103) in a preset scan cycle;

a column driver (109) including:

digital-to-analog converter units (202) for converting digital video data to gray scale signals;

a plurality of buffer amplifiers (201) for sequentially amplifying and outputting the gray scale signals in a preset output cycle; and an output switch circuit (14) comprising a plurality of switches (250) connected between output terminals of the buffer amplifiers (201) and one ends of the data lines (102);

a delay control circuit (115) for controlling the scan driver (108) so that the preset scan cycle is delayed from the preset output cycle just by a predetermined delay period;

an output switch control circuit (116) for controlling the output switch circuits (250) to be kept off during the predetermined delay period; and a display controller (120) for controlling the video data, the scan driver (108), the column driver (109), the delay control circuit (115), and the output switch control circuit (116), respectively.

In the present invention, a plurality of switching noise compensation circuits (251) are provided. The switching noise compensation circuits (251) are connected to the one ends of the data lines (102), respectively, while the switches (250) are connected to the one ends of the data lines, respectively.

In the present invention, the output switch circuit (114) includes first transistors constituting the switches (250). A first control signal output from the output switch control circuit (116) are input to control terminals of the first transistors. Drains and sources of the first transistors are connected between a corresponding one of the output terminals of the buffer amplifiers (201) and a corresponding one of the one ends of the data lines (102). Each of the switching noise compensation circuits (251) includes a second transistor of same conductivity types as the conductivity types of the first transistor. The inverted signal of the first control signal is input to a control terminal of the second transistor, and a drain and source of the second transistor are connected in common to the corresponding one of the one ends of the data lines.

In the active matrix type display device according to the present invention, one output period of the preset output cycle includes:

a first time period during which the switches (250) of the output switch circuit (114) are set in an off state by the output switch control circuit (116) with the buffer amplifiers (201) made active; and a second time period during which the switches (250) of the output switch circuit (114) are set in an on state by the output switch control circuit (116) with the buffer amplifiers (201) made active.

Further, in the present invention, one scan selection period during which one of the scan lines (103) is selected, and voltages at the data lines (102) are supplied to the pixel electrodes (117) through the thin-film transistors (105) connected to the selected one of the scan lines (103) includes:

a first time period during which the switches (250) of the output switch circuit (114) are set in an on state by the output switch control circuit (116); and a second time period during which the switches (250) of the output switch circuit (114) are set in an off state by the output switch control circuit (116).

Further, in the present invention, one output period of the preset output cycle includes:

a first time period during which the switches (250) of the output switch circuit (114) are set in an off state by the output switch control circuit (116), with the buffer amplifiers (201) made active; and a second time period during which the switches (250) of the output switch circuit (114) are set in an on state by the output switch control circuit (116), with the buffer amplifiers (201) made active; and one scan selection period is set to be between a start time of the second time period and a completion time of the first time period of a next one output period, in the one scan selection period, one of the scan lines (103) is selected, and voltages at the data lines (102) are supplied to the pixel electrodes (117) through the thin-film transistors (TFTs)(105) connected to the selected one of the scan lines (103).

In the active matrix type display device according to the present invention, the buffer amplifiers (201) each have an offset canceling function (an offset compensation circuit 404), and a preparation period for detecting an offset value and allowing a compensated output is overlapped with the first time period.

In the present invention, at least the same number of the buffer amplifiers (201) and the switches (250) as the number of all of the data lines (102) arranged on the display unit (101) are provided, and drive the all of the data lines (102) simultaneously.

In the present invention, a display element of the display unit (101) may be a liquid crystal element (106) or an organic EL element (501).

A column driver (109) according to the present invention includes:

a gray scale voltage generation circuit (204) for generating a plurality of gray scale voltages composed of analog reference voltages;

a plurality of digital-to-analog converter units (202) for receiving video data represented by a digital signal corresponding to the gray scale voltages and the number of outputs of the digital-to-analog converter units (202), selecting gray scale voltages according to the video data from among the gray scale voltages, and outputting the selected gray scale voltages as gray scale signals;

a plurality of buffer amplifiers (201) for amplifying the gray scale signals output from the digital-to-analog converter units (202), for output; and an output switch circuit (114) comprising a plurality of switches (250) connected between output terminals of the buffer amplifiers (201) and output terminals (810) of the driver, respectively, the output switch circuit (114) being controlled to be turned on or off by an output switch control circuit (116); and a plurality of switching noise compensation circuits (251) connected to the output terminals of the driver, respectively.

In the column driver (109) of the present invention, as a preceding-stage circuit for the digital-to-analog converter units (202), the column driver (109) further includes:

a shift register (208) for receiving a first control signal and outputting shift pulses obtained by sequentially shifting a pulse signal in accordance with the first control signal;

a data register (207) for receiving a second control signal and the video data and distributing the video data for each of the shift pulses;

a data latch (206) for temporarily holding the distributed video data and outputting the video data to the digital-to-analog converter units in response to the second control signal; and a level shifter (205) for performing level conversion of the data output from the data latch.

A method of driving an active matrix type display device of the present invention is the method of driving the active matrix type display device having:

a display unit (101) including;

a plurality of data lines (102) and a plurality of scan lines (103) arranged in a crossed form;

a plurality of pixel electrodes (117) arranged at intersections between the data lines (102) and the scan lines (103) in a matrix form; and a plurality of thin-film transistors (TFTs) (105) each provided for each of the pixel electrodes (117), one of a drain and a source of each of the TFTs being connected to a corresponding one of the pixel electrodes (117), the other one of the drain and the source of the each of the TFTs being connected to a corresponding one of the data lines (102), a gate of the each of the TFTs being connected to a corresponding one of the scan lines (103);

a scan driver (108) for supplying a scan signal to each of the scan lines (103) in a preset scan cycle;

a column driver (109) including:

digital-to-analog converter units (202) for converting video data to gray scale signals;

a plurality of buffer amplifiers (201) for sequentially amplifying and outputting the gray scale signals in a preset output cycle; and an output switch circuit (114) comprising a plurality of switches (250) connected between the buffer amplifiers and one ends of the data lines (102); and a display controller (120) for controlling the video data, the scan driver (108), and the column driver (109), respectively. Control is performed so that the preset scan cycle is delayed from the preset output cycle just by a predetermined delay period, and the switches (250) of the output switch circuit (114) are controlled to be kept off during the predetermined delay period.

In the present invention, the column driver (109) may be integrally formed on an insulating substrate, or may be fabricated on a single crystal silicon LSI.

The meritorious effects of the present invention are summarized as follows.

According to the present invention, by each of the output switch circuits provided between the output terminals of the buffer amplifiers (operational amplifiers) of the column driver and the one ends of the data lines, supply of the voltage to the corresponding one of the data lines is shut down for the predetermined period until the output signal of the corresponding one of the buffer amplifiers changes to a target gray scale signal voltage corresponding to the video data. Then, after the predetermined period, supply of the voltage to the data line using the output signal of the buffer amplifier is started. Further, a phase of the scan signal is delayed by the predetermined period. With this arrangement, immediately after a period in which the scan signal is set HIGH and the signal voltage of the data line is supplied to the corresponding one of the pixel electrodes has been started, a voltage on the near end of the data line can be instantaneously changed to the target gray scale signal voltage. The supply of the voltage to the data line from the buffer amplifier is stopped before completion of the period in which the signal voltage of the data line is supplied to the pixel electrode. However, by supplying the electric charges held on the data line with a large capacitance to the pixel electrode, the voltage of the pixel electrode can be adequately made close to the target gray signal voltage. The display panel can be thereby driven without degrading display quality thereof.

According to the present invention, driving capability of the gray scale signal voltage can be improved without increasing driving capability of the buffer amplifier (operational amplifier).

Further, compared with a display device in which by increasing current consumption of the buffer amplifier (operational amplifier) and enhancing the driving capability of the buffer amplifier, the driving capability of the gray scale signal voltage is improved, the present invention can implement lower power consumption.

Still other effects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIGS. 12A and 12B show waveforms of a data line driving voltage at a near end of a load and at a far end of the load, obtained by a driving method in a first embodiment of the present invention;

PREFERRED EMBODIMENTS OF THE INVENTION

Figure 1:
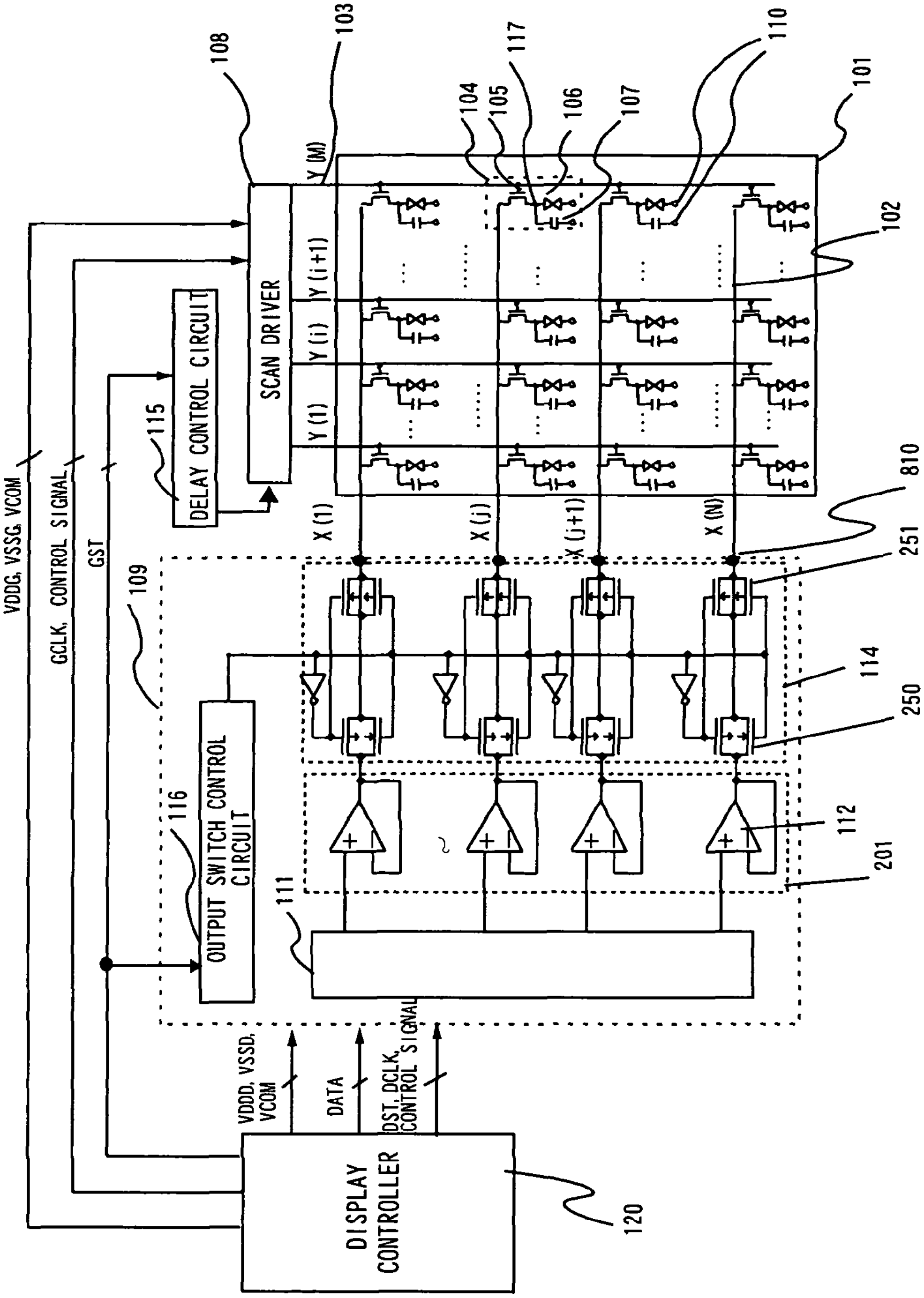
FIG. 1 is a diagram showing a general configuration of an active matrix type display device according to a first embodiment of the present invention.

In order to describe the present invention described above in further detail, a description will be given with reference to appended drawings. FIG. 1 is a diagram showing a configuration of an active matrix type liquid crystal display device according to a first embodiment of the present invention. Referring to FIG. 1, same reference characters are assigned to components common to those in FIG. 14. The following description will mainly focus on a difference, and a description of same components will be omitted as necessary in order to avoid repetition. Same reference characters or numerals are assigned to comparable elements in all diagrams to be shown below. Further, a description will be directed to a configuration of an active matrix type liquid crystal device. When the present invention, however, is applied to other active matrix type display device, the same effect can be achieved regardless of configurations of a display element and a pixel circuit.

First Embodiment

A configuration of a first embodiment of the present invention will be described below. FIG. 1 is a diagram showing a configuration of an active matrix type liquid crystal display device according to the first embodiment of the present invention. Referring to FIG. 1, the active matrix type liquid crystal display device of the present invention includes a liquid crystal panel 101, a scan driver 108, a column driver 109, a display controller 120, a delay control circuit 115, and an output switch control circuit 116.

The liquid crystal panel 101 is constituted from two substrates and a liquid crystal sandwiched between these two substrates. One of the substrates includes scan lines 103, data lines 102, and pixel circuits 104 provided at intersections between the scan lines 103 and the data lines 102. For each pixel, a pixel circuit 104 is formed.

Output terminals of the scan driver 108 are connected to one ends of the scan lines 103, and output terminals of the column driver 109 are connected to one ends of the data lines 102.

Figure 14:
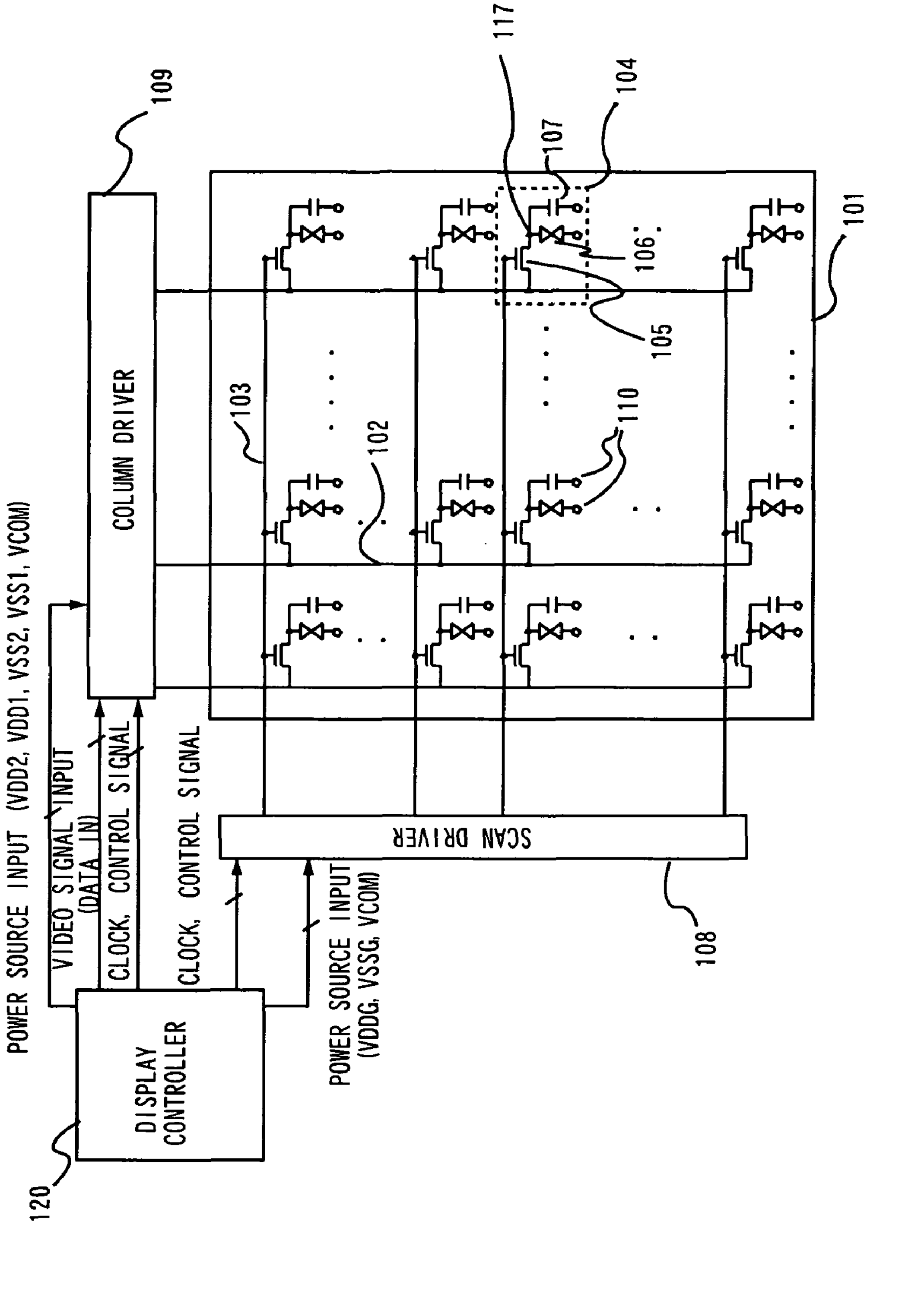
FIG. 14 PRIOR ART
FIG. 14 is a schematic diagram showing a configuration of a conventional active matrix type liquid crystal display device.

Though the configuration of the liquid crystal panel 101 in FIG. 1 is the same as the configuration of the liquid crystal panel 101 in FIG. 14, the data lines 102 are drawn to extend in a horizontal direction, and the scan lines 103 are drawn in a vertical direction, simply for convenience in drawing.

The pixel circuit 104 includes a TFT 105 that becomes a switching device, a liquid crystal display element 106 for holding a gray scale signal voltage, and a storage capacitance 107.

A gate of the TFT 105 is connected to a scan line 103, and a data line 102 is connected to a drain of the TFT 105. Then, one end of the liquid crystal display element 106 and one end of the storage capacitance 107 are connected in common to a source of the TFT 105. Other ends of the liquid crystal display element 106 and the storage capacitance 107 are connected in common to a common electrode 110.

The pixel circuit 104 may have other configuration if it includes the switching device and the display element. The display element may be other than the liquid crystal display element. An organic EL display element shown in a fourth embodiment that will be described later, for example, may be used.

A connecting relationship between the switching device and the display element in the pixel circuit and the circuit configuration of the pixel circuit are not limited to those of the pixel circuit 104 in FIG. 1.

The column driver 109 includes a preceding-stage circuit unit 111, buffer amplifiers 201, output switch circuits 114, and an output switch control circuit 116.

Figure 15:
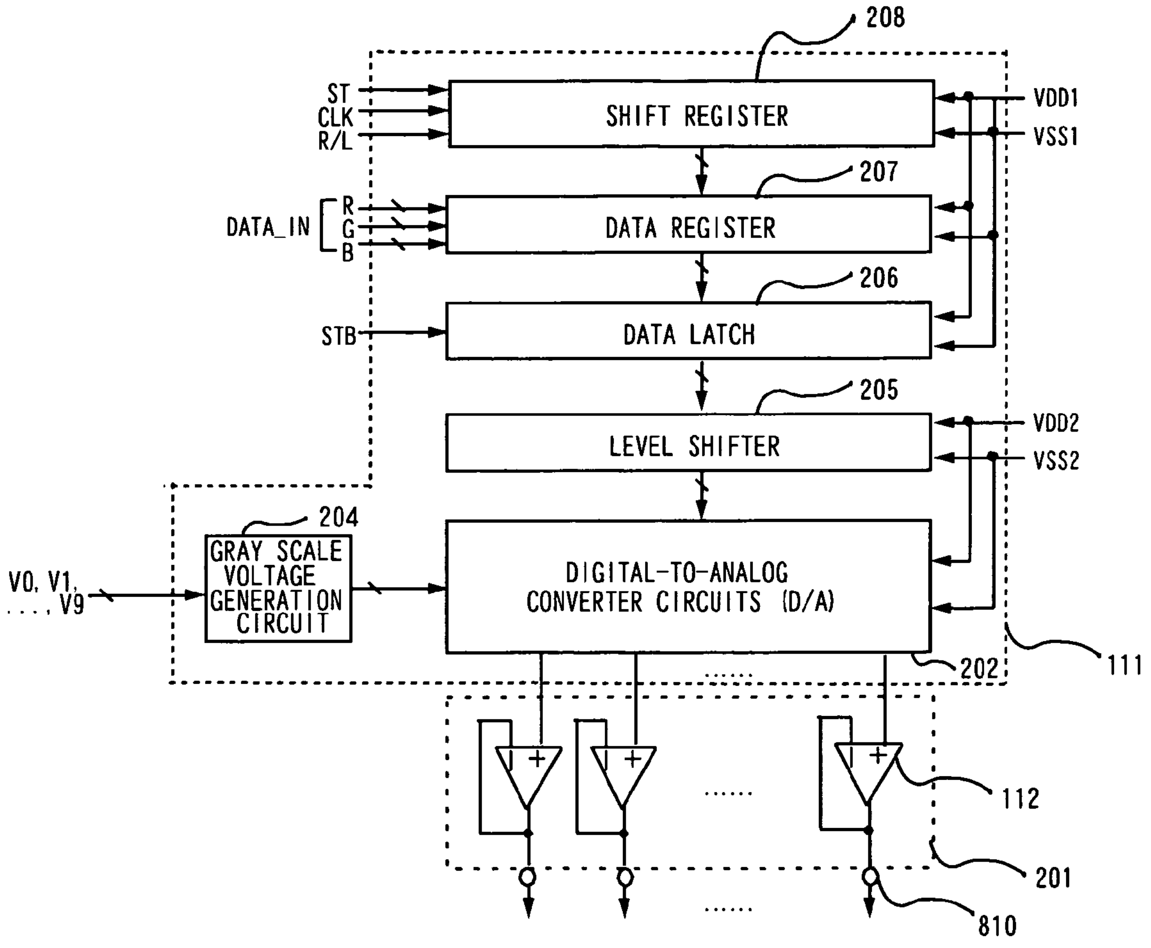
FIG. 15 PRIOR ART
FIG. 15 is a schematic diagram showing a configuration of a column driver of the conventional active matrix type liquid crystal display device.

The preceding-stage circuit unit 111 has the configuration in which the buffer amplifiers 201 are removed from a column driver shown in FIG. 15 described before, and the configuration of the preceding-stage circuit unit 111 is omitted for convenience in drawing. A reference may be made to FIG. 15, regarding the configuration of the preceding-stage circuit unit 111.

That is, the preceding-stage circuit unit 111 indicates a circuit unit constituted from a shift register 208, a data register 207, a data latch 206, a level shifter 205, a gray scale voltage generation circuit 204, and digital-to-analog converter circuits 202 in a column driver shown in FIG. 15.

Referring to FIG. 1 again, the buffer amplifiers 201 are constituted from a plurality of operational amplifiers 112 of a voltage follower configuration. The operational amplifiers 112 may be configured in any form. The operational amplifiers 112 are assumed to be optimized according to a magnitude of a data line load.

Output terminals of the preceding-stage circuit unit 111 are connected to non-inverting input terminals (+) of the operational amplifiers 112. Output terminals of the operational amplifiers 112 are connected in a negative feedback manner to inverting input terminals (−) of the operational amplifiers 112.

The output terminals of the operational amplifiers 112 are connected to input terminals of the output switch circuits 114. Gray scale signal voltages amplified by an operational amplifiers 112 are supplied to respective data lines 102 through an output switch circuit 114.

The output switch circuits 114 comprises a plurality of switches 250 which are connected between the respective output terminals of the operational amplifiers 112 and the respective data lines 102 of the liquid crystal panel 101. Responsive to an output switch control signal output from the output switch control circuit 116, the switches 250 are simultaneously subject to on/off control.

When an output switch circuit 114 is turned on, that is, when the switches 250 are turned on, gray scale signals output from operational amplifiers 112 are supplied to data lines 102. When the output switch circuit 114 is turned off, the gray scale signals output from the operational amplifier 112 are not supplied to the data lines 102. A voltage at the data line 102 is held by an interconnect capacitance formed on the liquid crystal panel 101.

For a switch 250 of the output switch circuit 114, a CMOS switch or the like constituted from an N-ch transistor and a P-ch transistor can be employed.

The output switch control circuit 116 is the circuit for generating the output switch control signal responsive to a control signal GST output from the display controller 120.

Though the output switch control circuit 116 in FIG. 1 constitutes one component of the column driver 109, the output switch control circuit 116 may be arranged within the display controller 120.

The output switch circuit 114 may further include a switching noise compensation circuit 251 for canceling switching noise generated when a switch 250 changes from on to off. The switching noise is generated by channel charge injection or clock feed-through.

In the present invention, even after the switch 250 has changed from on to off, it is necessary to hold the gray scale signal voltage which has been supplied to the corresponding data line 102 and held in a data line capacitance, for a predetermined period. The switching noise compensation circuit 251 is provided in order to prevent the gray scale signal voltage held on the data line 102 from being changed by the switching noise.

The switching noise compensation circuit 251 is connected between the switch 250 and a near end of each of the data lines 102. Each switching noise compensation circuit 251 comprises transistors of the same polarities as those of a switch 250, and inverted signals of control signals supplied to control terminals of the switch 250. Referring to FIG. 1, each switching noise compensation circuit 251 is constituted from the N-ch transistor and the P-ch transistor (or constituted from an MOS capacitor including the P-ch and N-ch transistors connected in parallel) with drains and sources thereof being short-circuited. The common connection nodes between the drains and the sources of the N-ch and P-ch transistors constituting the switching noise compensation circuit 251 are connected in common to a connection node between the switch 250 and the near end of the data line 102. The inverted signals of the control signals supplied respectively to the control terminals of the N-ch transistor and the P-ch transistor constituting the switch 250 are supplied to the control terminals of the N-ch transistor and the P-ch transistor constituting the switching noise compensation circuit 251, respectively. The physical dimension of the transistors constituting the switching noise compensation circuit 251 is set to be about a half of the size of the switch 250 that generates the noise.

As described in the above regarding the switching noise compensation circuit 251, a method of providing a dummy switch for noise compensation is described in Non-patent Document and Patent Documents 3 through 5, for example.

The scan driver 108 comprises a shift register, a buffer, or the like, any of which are not shown.

The scan lines 103 are connected to the output terminals of the scan driver 108. The scan driver 108 can control a phase of a scan signal to be output to a scan line according to a control signal output from the delay control circuit 115.

According to the scan signal output from the scan driver 108, TFTs 105 connected to a selected scan line are turned on in unison, and gray scale signal voltages output to the data lines are supplied to pixel electrodes 117.

The delay control circuit 115 is the circuit for outputting to the scan driver 108 a control signal responsive to the control signal GST output from the display controller 120.

According to the control signal output from the delay control circuit 115, the phase of the scan signal can be delayed at a predetermined interval. That is, the phase of the scan signal is delayed relative to a time when an input of the gray scale signal is changed. A method of delaying a start pulse for the shift register through the delay circuit by a predetermined period, for example, is simple and easy. The delay control circuit 115 may be contained in the display controller 120.

Next, an operation of the active matrix type liquid crystal display device according to the present embodiment shown in FIG. 1 will be described with reference to a timing chart in FIG. 2. As a method of performing polarity inversion driving of a voltage applied to the liquid crystal, a method of performing dot inversion driving will be hereinafter employed.

Hereinafter, a cycle for supplying the scan signal is defined to be a scan cycle, while a cycle for outputting the gray scale signal by each buffer amplifier is defined to be an output cycle. One horizontal period (1H) is indicated by TH [μsec], one output period of the output cycle of the gray scale signal input to the buffer amplifier is indicated by TDATA, and one scan selection period for selecting one scan line according to the scan signal is indicated by TSCAN. Times required for the period TDATA and the period TSCAN are indicated by TDATA=TH [μsec], and TSCAN≈TH [μsec], respectively.

Figure 2:
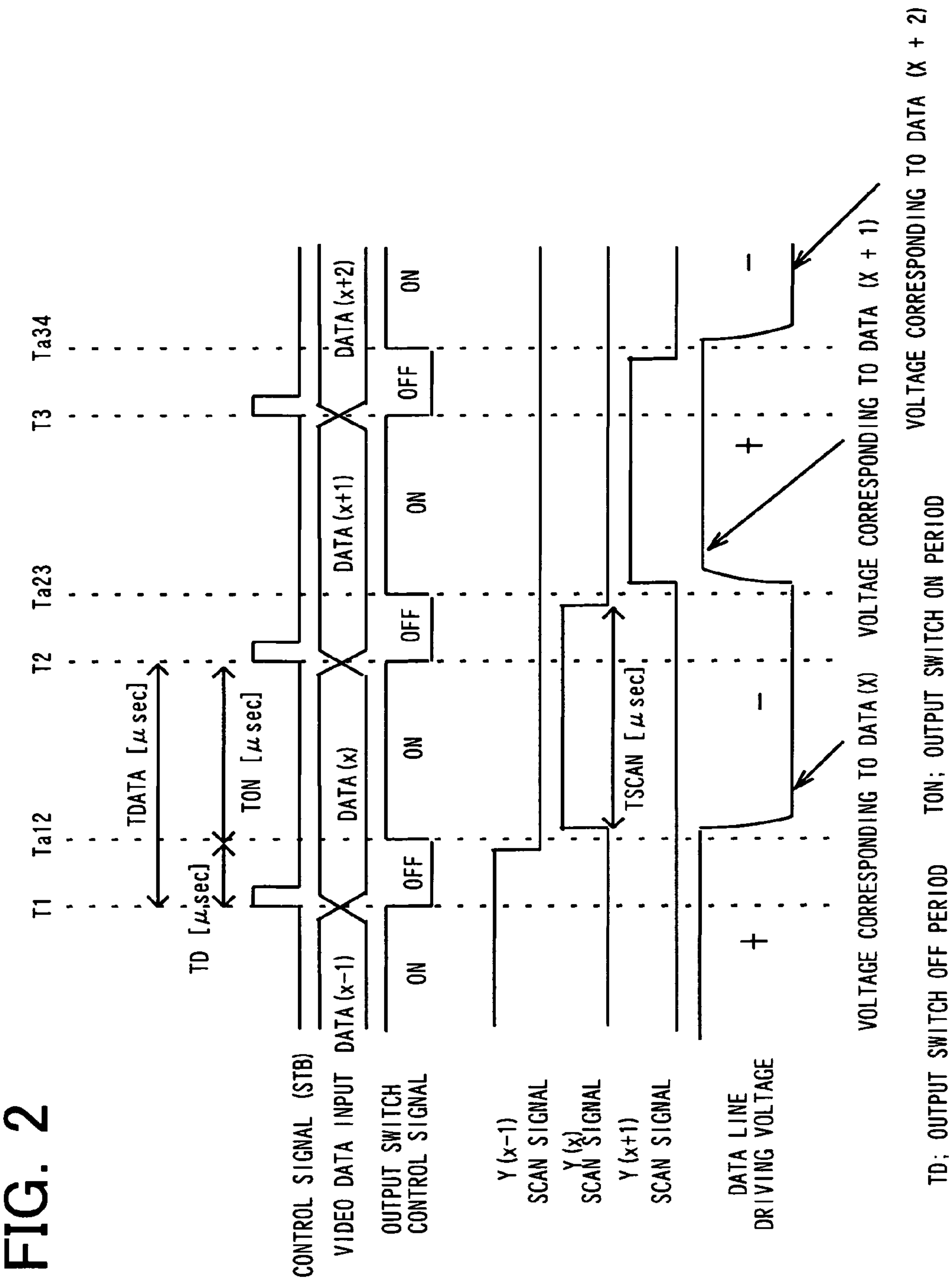
FIG. 2 is a timing chart diagram showing a method of driving the active matrix type display device in the first embodiment of the present invention.

Referring to FIG. 2, a control signal STB, digital video data DATA (x) and digital video data DATA (x+1) associated with one data line, an output switch control signal, scan signals Y(x) and Y(x+1), and a driving voltage for the one data line are shown. The control signal STB and the video data DATA (x) and DATA (x+1) are the same as those in FIG. 15.

The control signal STB is set to the signal with the fixed cycle TDATA, and timings of rising edges of the control signal STB are sequentially set to T1, T2, and T3. A pulse width of the control signal STB is set to an arbitrary value shorter than the cycle TDATA.

The video data DATA (x) and DATA (x+1) indicate data signals output from the data latch in the preceding-stage circuit unit 111 of the column driver 109, and output to the level shifter 205 responsive to the rise timings T1 and T2 of the control signal STB.

Then, the video DATA (x) and DATA (x+1) are converted to gray scale signals corresponding to the video data by the digital-to-analog converter units and supplied to the operational amplifier 112. Accordingly, the gray scale signals corresponding to the video data DATA (x) and DATA (x+1) are output from the operational amplifier 112 at substantially the same timings as T1 and T2, respectively.

The output switch control signal is kept LOW during a period TD from the rise timings(T1, T2, and T3) of the control signal STB, which causes the respective switches 250 of the output switch circuits 114 to be turned off.

The period TD is set based on a time required for an output signal of the operational amplifier 112 to adequately reach a target gray scale signal voltage. A change in the output signal of the operational amplifier 112 or the slew rate of the operational amplifier 112 depends on performance of the operational amplifier 112. It is assumed that in order to obtain a stable output, a sufficient phase margin is secured.

Referring to FIG. 2, timings after the period TD from the rise timing (T1, T2, and T3) of the control signal STB are indicated by timings (Ta12, Ta23, and Ta34), respectively.

The output switch control signal is set HIGH at the timings (Ta12, Ta23, and Ta34) after the period TD. This causes each of the switches 250 of the output switch circuits 114 to be turned on. The output signal of the operational amplifier 112 is thereby supplied to the near end of the data line 102.

At this point, a voltage at the near end of the data line 102 is instantaneously driven to the target gray scale signal voltage, since the output signal of the operational amplifier 112 has already changed to the target gray scale signal voltage.

Figure 16:
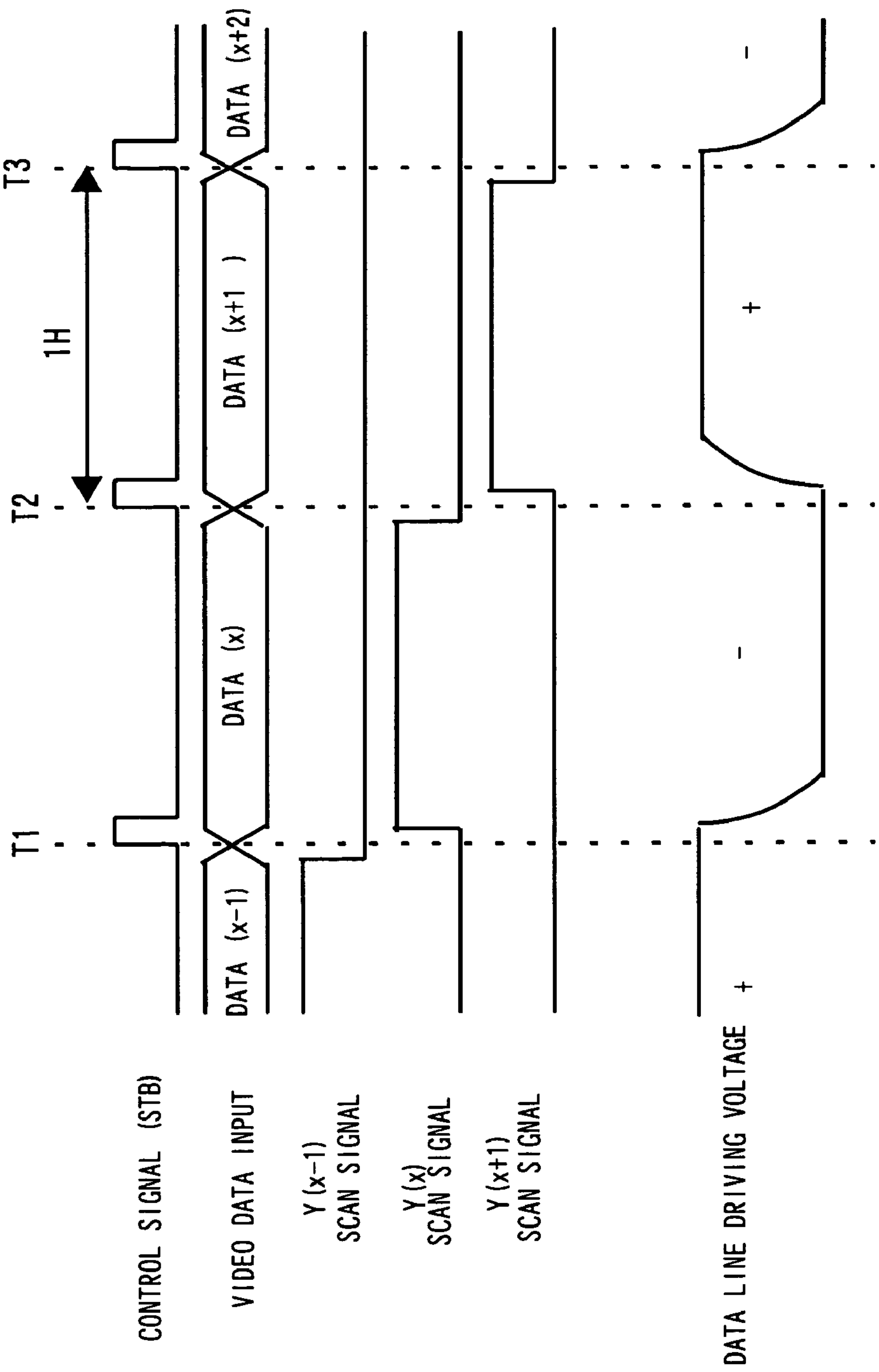
FIG. 16 PRIOR ART
FIG. 16 is a timing chart diagram showing a driving method of the conventional active matrix type liquid crystal display device.

The scan signals Y(x) and Y(x+1) indicate the scan signals of the adjacent scan lines and are set at timings phase-delayed just by the period TD from scan signals in a timing chart shown in FIG. 16.

That is, the scan signal Y(x) is set HIGH from the timing Ta12 to the timing Ta23, and set LOW otherwise. From the timing Ta12 to the timing Ta23, the TFTs of one column connected to the scan line driven by the scan signal Y (x) are turned on. The gray scale signal output to each data line is supplied to each pixel electrode of the pixel circuits of one column.

The scan signal Y(x+1) is set HIGH from the timing Ta23 to the timing Ta34 (during a period TON), and set LOW otherwise. From the timing Ta23 to the timing Ta34, the gray scale signal output to each data line is supplied to each pixel electrode of the pixel circuits of next one column.

Supply of the gray scale voltage signal to the data line from the operational amplifier 112 is performed in a period during which the output switch control signal is HIGH.

Accordingly, the gray scale signals corresponding to the video data DATA (x) and DATA (x+1) are supplied to the data line from the operational amplifier 112 in the periods from the timing Ta12 to the timing T2 and from the timing Ta23 to the timing T3, respectively.

Though the supply of the output signal of the operational amplifier 112 to the data line is cut off from the timing T2 to the timing Ta23 and from the timing T3 to the timing Ta 34, the voltages of the gray scale signals corresponding to the video data DATA (x) and DATA (x+1) are held on the data line, respectively. Accordingly, a data line driving voltage becomes the gray scale signal voltages corresponding to the video data DATA (x) and DATA (x+1) from the timing Ta12 to the timing Ta23 and from the timing Ta23 to the timing Ta34, respectively. Meanwhile, in FIG. 2, the gray scale signal voltages corresponding to the video data DATA (x) and DATA (x+1) are indicated by the gray scale signal of a negative polarity (−) and the gray scale signal of a positive polarity (+), respectively.

The scan signals Y(x) and Y(x+1) are kept HIGH from the timing T2 to the timing Ta23 and from the timing T3 to the timing Ta 34, respectively, and the gray scale signal voltages held on the data line are supplied to the pixel electrodes of the pixel circuits through the TFTs.

While the interconnect capacitance of a data line is very large in a large-screen and high-resolution display panel, the capacitance value of a capacitance element in one pixel circuit is sufficiently smaller than the interconnect capacitance of the data line. For this reason, even if supply of the gray scale signal from the data line to the pixel electrode is continued from the timing T2 to the timing Ta23 or from the timing T3 to the timing Ta34, the gray scale signal voltage held in the data line will not be changed. The voltage at the selected pixel electrode can continue changing to target gray scale signal voltage. That is, a time for supplying the gray scale signal voltage from the data line to the pixel electrode is the same as that in a conventional driving method described with reference to FIG. 16.

Figure 13:
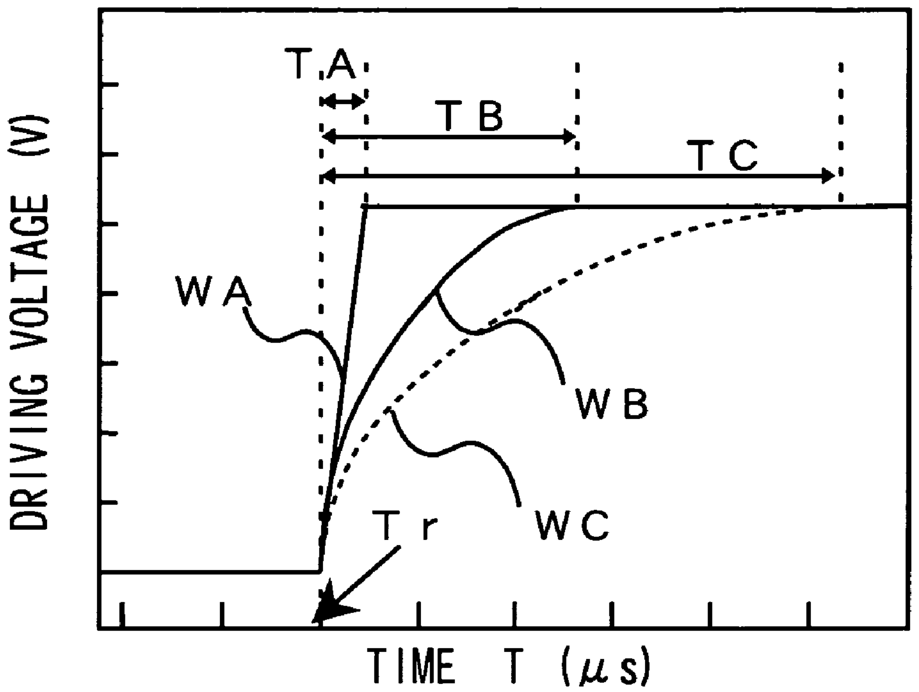
FIG. 13 is a schematic diagram of driving waveforms showing supply of electric charges to pixels.

Accordingly, in the present embodiment, a rise timing Tr with respect to a voltage waveform WA at the data line near end, a voltage waveform WB at a data line far end, and a voltage waveform WC at the pixel electrode, which have been described with reference to FIG. 13, corresponds to the timing Ta 23 in FIG. 2. The effect comparable to improvement of the slew rate of the voltage waveform WA can be implemented. As a result, driving capability of the gray scale signal voltage can be improved without increasing driving capability of an output buffer. Thus, driving that implements high display quality is possible for the large-screen, high-resolution display panel as well.

As the period TON during which the output switch control signal in FIG. 2 is set HIGH, it is necessary to secure at least a period TB (see FIG. 13) until the voltage waveform WB at the far end of the data line 102 reaches the target gray scale signal voltage.

In the present embodiment, the output signal of the buffer amplifier (operational amplifier) should be changed to the target gray scale signal voltage within the time period TD from the time when the input of the gray scale signal has been changed. That is, driving capability of the buffer amplifier does not need to be increased in particular, and current consumption of the buffer amplifier does not need to be increased. Further, lower power consumption can be achieved, compared with a display device in which the driving capability of the gray scale signal voltage is improved by increasing the current consumption of the buffer amplifier (operational amplifier) and thereby enhancing the driving capability of the buffer amplifier (operational amplifier).

In the present embodiment, a delay of the scan signal caused by the delay control circuit 115 greatly differs from synchronization adjustment made in a driver circuit for a display device in general.

In the synchronization adjustment for the display device that is made in general, only rise and fall timings of a pulse of various control signals are at most adjusted within a horizontal blanking period (<1 μs).

On contrast therewith, in the present invention, by intentionally delaying the phase of the scan signal as from the video data input by a longer time (TD: 3-5 μs) and turning off the output switch circuit 114 in a latter half period (that is, in the time period TD) of the scan selection period (TSCAN), 1) the data line driving voltage is instantaneously raised when the output switch circuit 114 is transitioned from off to on, and 2) supply of electric charges from the data line to the pixel electrodes is performed in a period during which the output switch 114 is set in an off state. A shortage of a time for supplying electric charges to the pixel electrodes can be thereby solved.

A period for turning off the output switch circuit 114 and a delay time in the scan selection period both require the time TD and are based on the same control signal. The same control signal GST is input to the delay control circuit 115 and the output switch control circuit 116 in order to generate the time TD and each of the delay control circuit 115 and the output switch control circuit 116 includes a delay control circuit for generating a preset signal.

When the scan signal for the video data input is delayed by TD [μs] by a conventional display device, for example, a change to the input signal of the next video data is performed in the latter half period (TD [μ s]) because the output switch is always in an on state. An erroneous gray scale voltage will be thus supplied to the pixel electrode. For this reason, delay control shown above normally becomes impossible.

A method of reducing a rise time of the output of the buffer amplifier is described in Patent Document 1 (Japanese Patent Kokai Publication No. JP-P2001-22328A) and Patent Document 2 (Japanese Patent Kokai Publicaiton No. JP-P2004-61970A). In Patent Document 1, in a configuration in which a precharge control circuit is provided in a stage preceding input to the buffer amplifier, impedance reduction is achieved. In the present invention, such a configuration is not required, and charging and discharging from a precharging potential to the predetermined gray scale signal voltage is not necessary. In Patent Document 2, a portion of a reset period (portion of a horizontal scan period) is used to stabilize an output potential of the buffer, and then, the data line and the output terminal of the buffer are connected. No mention is not made to control over the scan line. In the case of a configuration in Patent Document 2, the time for supplying electric charges to the pixel electrode would become the period obtained by subtracting the reset period from the horizontal period.

On contrast therewith, in the present embodiment, the scan cycle is delayed by a predetermined delay time with respect to the output cycle. As a result, the driving voltage at the data line near end can be instantaneously raised from the time in which the horizontal period is started. The horizontal period is thus effectively utilized to secure the time for supplying electric charges to the pixel electrode.

Further, Patent Documents 1 and 2 disclose only the configuration of and control over a data line driver circuit, and no mention is made to control in which a scan line driving circuit works in cooperation with the data line driver circuit.

In the description described before, a time when input of the gray scale signal to the buffer is used as a reference, for convenience's sake. A rise or a fall of the control signal (STB) or any timing of other control signal can be used as the reference. If delay of the scan signal with respect to input of the gray scale signal is meant in a relative relationship between the input of the gray scale signal and the phase of the scan signal, any time or timing can be used as the reference.

Further, a description was made based on a premise that the dot inversion driving method is used as the polarity inversion driving method of the liquid crystal. The same effect, however, can be obtained through the use of any polarity inversion driving method such as a gate line inversion driving method or a frame inversion driving method.

The same effect is also obtained even when a display element other than the liquid crystal and the pixel circuit thereof are used.

Second Embodiment

Figure 3:
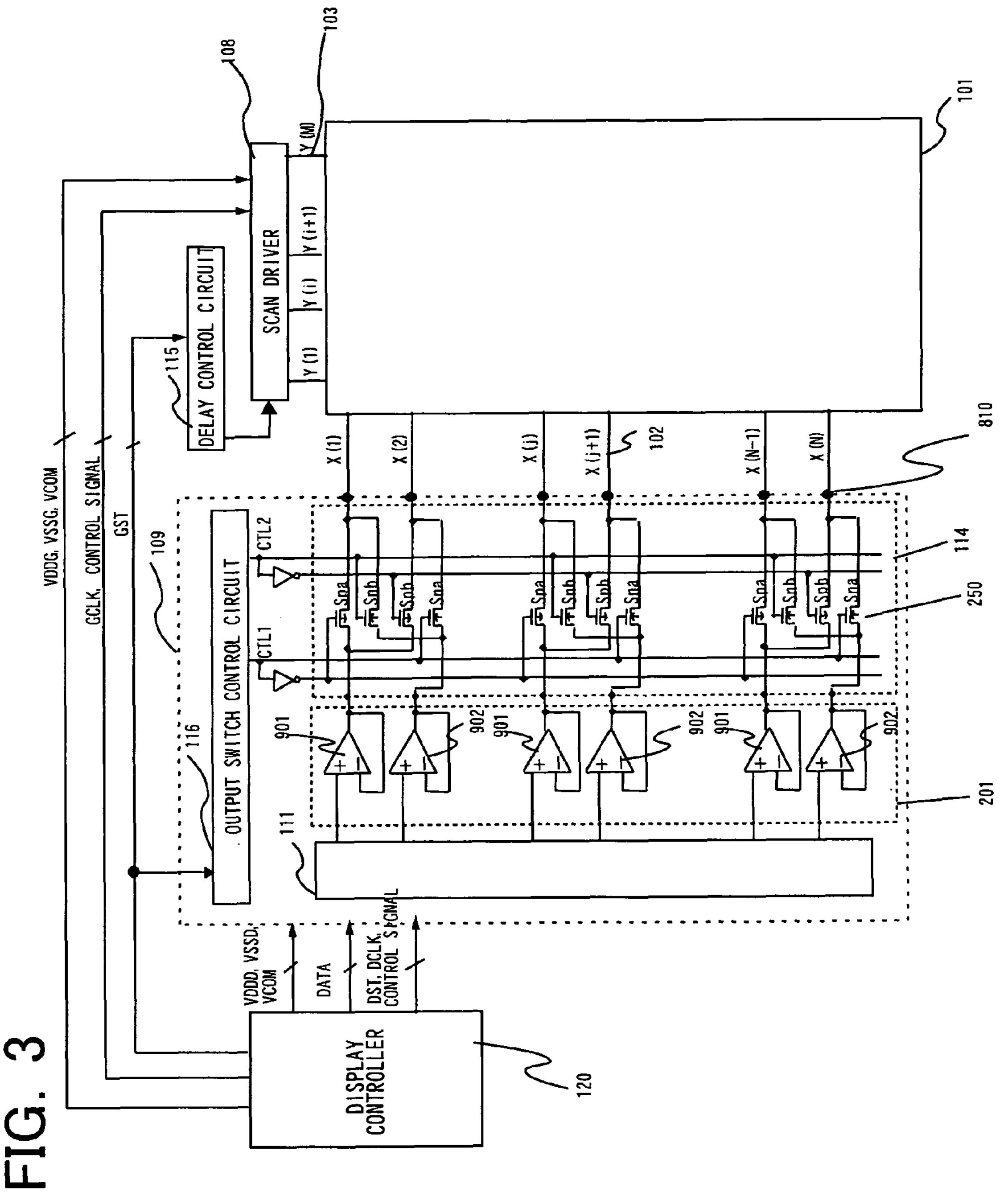
FIG. 3 is a diagram showing a general configuration of an active matrix type display device according to a second embodiment of the present invention.

A second embodiment of the present invention will be described below. FIG. 3 is a diagram showing a configuration of an active matrix type liquid crystal display device according to the second embodiment of the present invention. This embodiment is different from the first embodiment shown in FIG. 1 in the buffer amplifiers 201, output switch circuits 114, and preceding-stage circuit unit 111. Other configurations are the same as those in the first embodiment. A difference from the first embodiment will be described below.

Each of the buffer amplifiers 201 has a configuration in which a positive output side operational amplifier 901 and a negative output side operation amplifier 902 are alternately arranged, and respectively provided for each data line.

The positive output side operational amplifier 901 is the operational amplifier that outputs a positive voltage with respect to a voltage Vcom of the common electrode 110 for the liquid crystal panel 101. The negative output side operational amplifier 902 is the operational amplifier that outputs a negative voltage with respect to the voltage Vcom of the common electrode 110 for the liquid crystal panel 101. Each of the operational amplifiers has a voltage follower configuration.

Each output switch circuit 114 comprises a plurality of switches with four switches Spa, Spb, Sna, and Snb as one set. The four switches Spa, Spb, Sna, and Snb are connected between output terminals of the operational amplifiers 901 and 902 of positive and negative polarities and two data lines 102 of the liquid crystal panel 101. The switches Spa and Spb are the switches each constituted from the P-ch transistor, and the switches Sna and Snb are the switches each constituted from the N-ch transistor.

The switches (Spa, Spb, Sna, and Snb) are subject to on/off control simultaneously by two control signals CTL1 and CTL2 output from the output switch control circuit 116.

With regard to a method of alternately arranging the positive polarity operational amplifier 901 and the negative polarity operation amplifier 902 and performing switching by the output switch as described above, descriptions in Patent Documents 6 and 7, for example, are referred to.

Next, an operation of the active matrix type liquid crystal display device in FIG. 3 will be described with reference to a timing chart in FIG. 4. The description will be made, assuming that as the polarity inversion driving method for the voltage applied to the liquid crystal, the dot inversion driving method is employed.

Hereinafter, the cycle for supplying the scan signal is defined to be the scan cycle, while the cycle for outputting the gray scale signal by the buffer amplifier is defined to be the output cycle. One horizontal period (1H) is indicated by TH [μsec], one output period of the output cycle of the gray scale signal input to the buffer amplifier is indicated by TDATA, and one scan selection period for selecting one scan line according to the scan signal is indicated by TSCAN. Times required for the period TDATA and the period TSCAN are indicated by TDATA=TH [μsec], and TSCAN≈TH [μsec], respectively.

Figure 4:
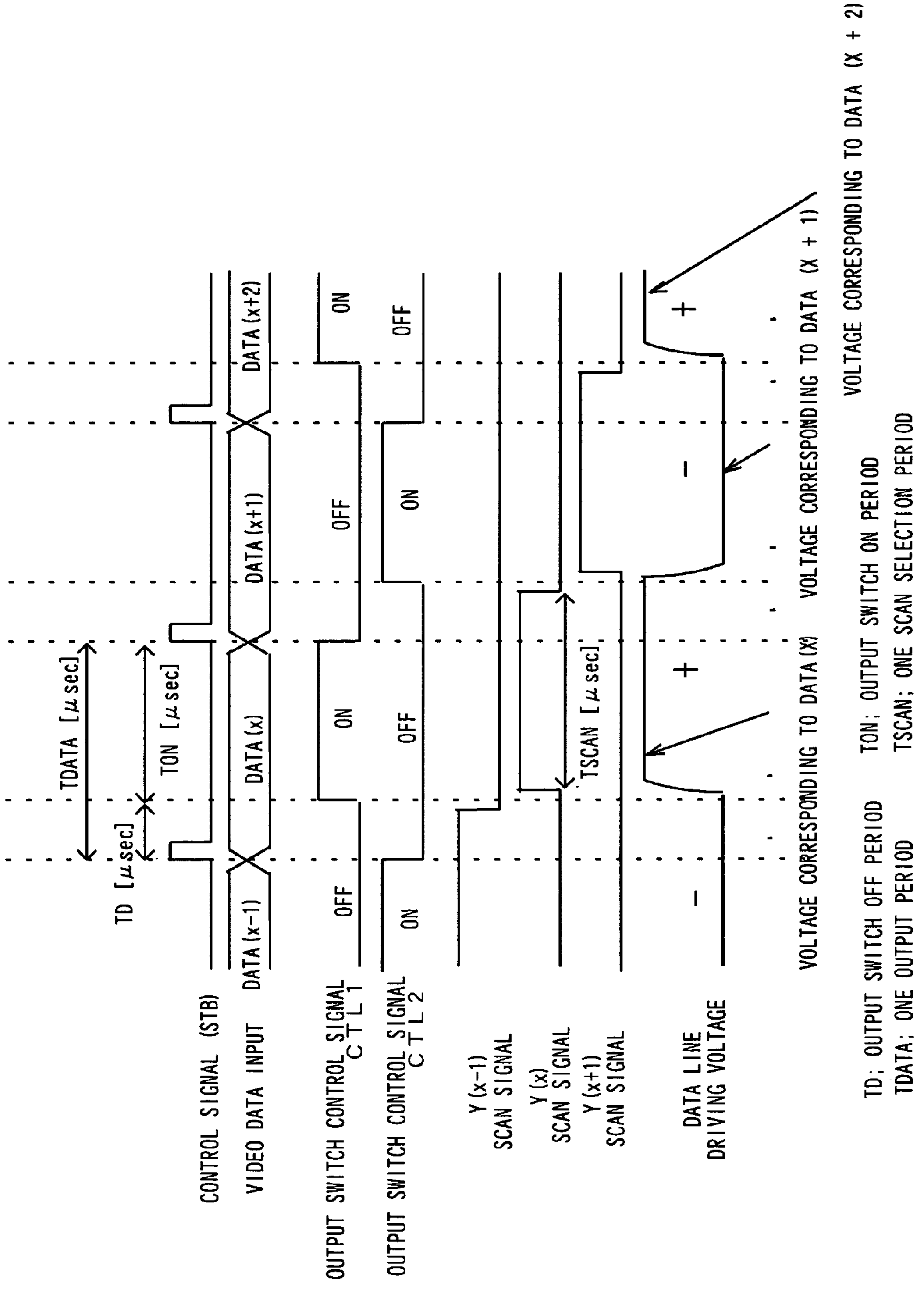
FIG. 4 is a timing chart diagram showing a method of driving the active matrix type display device in the second embodiment of the present invention.

A description about reference numerals or characters shown in FIG. 4 is the same as that in FIG. 2, which is the timing chart in the first embodiment described before. A difference between FIGS. 4 and 2 is that referring to FIG. 4, a connection state between the buffer and the data line, and the output switch control signals CTL1 and CTL2 are shown.

The output switch control signals CTL1 and CTL2 repeat the following four phases periodically.

In a first phase (from the timing T1 to the timing Ta12 in FIG. 4), the signal CTL2 is set LOW at the timing T1, so that both of the signals CTL1 and CTL2 go LOW. This causes the switches Spa, SPb, Sna, and Snb to be all turned off.

In a second phase (from the timing Ta12 to the timing T2 in FIG. 4), the signal CTL1 is set HIGH at the timing Ta12 and the signal CTL2 is kept LOW. This causes the switches Spa and Sna to be turned on, and causes the switches Spb and Snb to be turned off.

In a third phase (from the timing T2 to the timing Ta23 in FIG. 4), the signal CTL1 is set LOW at the timing T2, so that both of the signals CTL1 and CTL2 go LOW. This causes the switches Spa, SPb, Sna, and Snb to be all turned off.

In a fourth phase (from the timing Ta23 to the timing T3 in FIG. 4), the signal CTL2 is set HIGH at the timing Ta23, and the signal CTL1 is kept LOW. This causes the switches Spb and Snb to be turned on, and causes the switches Spa and Sna to be turned off.

By repeating the first to fourth phases periodically, connecting relationships between output terminals of the operational amplifiers (901 and 902) and the data lines 102 is determined.

In the first and third phases, the output terminals of the buffers (operational amplifiers) and the corresponding data lines are disconnected to each other. This period TD is set based on a time when output signals of the operational amplifiers (901, 902) adequately reach target gray scale signal voltages.

A change in the output signals of the operational amplifiers (901, 902) or the stew rates depend on performances of the operational amplifiers (901, 902). It is assumed that in order to obtain a stable output, a sufficient phase allowance is secured.

In the second phase, positive output side operational amplifier 901 are connected to odd-numbered data lines (X(1), X(3) . . . ), and negative output side operational amplifiers 902 are connected to even-numbered data lines (X(2), X(4) . . . ).

In the fourth phase, the positive output side operational amplifiers 901 are connected to the even-numbered data lines (X(2), X(4) . . . ), and the negative polarity output side operational amplifiers 902 are connected to the odd-numbered data lines (X(1), X(3) . . . ).

The output signals of the operational amplifiers (901 and 902) have already changed to the target gray scale signal voltages at the time (Ta12) when the second phase is started and at the time (Ta23) when the fourth phase is started. Thus, voltages at data line near ends are instantaneously driven to the target gray scale signal voltages.

The scan signals Y(x) and Y(x+1) indicate the signals on adjacent scan lines, and are set at timings delayed in their phases by the period TD with respect to the scan signals in FIG. 16. That is, the scan signal Y(x) is kept HIGH from the timing Ta12 to the timing Ta23, and kept LOW otherwise. From the timing Ta12 to the timing Ta23, one column of the TFTs connected to the scan line on which the scan signal Y(x) has been driven are turned on. The gray scale signal output to each of the data lines is supplied to each pixel electrode of the pixel circuits for the one column.

The scan signal Y(x+1) is kept HIGH from the timing Ta23 to the timing Ta34 (during the period TON), and kept LOW otherwise. From the timing Ta23 to the timing Ta34, the gray scale signal output to each of the data lines is supplied to each pixel electrode of the pixel circuits for the next column.

Supply of the gray scale voltage signals to the respective data lines from the operational amplifiers 901 and 902 is performed during periods when one of the output switch control signals CTL1 and CTL2 is HIGH (from the timing Ta12 to the timing T2 and from the timing Ta23 to the timing T3).

Accordingly, the video data DATA (x) is supplied from the operational amplifier (901) to the data line during the period from the timing Ta12 to the timing T2, and the DATA (x+1) is supplied from the operational amplifier (902) to the data line during the period from the timing Ta23 to the timing T3.

During periods from the timing T2 to the timing Ta23 and from the timing T3 to the timing Ta34, supply from the operational amplifiers (901, 902) to the data lines is shut down. The voltages of the gray scale signals corresponding to the DATA (x) and the DATA (x+1) are, however, held on the data lines, respectively, and these become data line driving voltages. In FIG. 4, the gray scale signal voltages corresponding to the video data DATA (x) and (x+1) are indicated by the gray scale signals of the positive polarity (+) and the negative polarity (−).

The scan signals Y(x) and Y(x+1) are kept HIGH from the timing T2 to the timing Ta 23 and from the timing T3 to the timing Ta34, respectively. The gray scale signal voltages held on the data lines are supplied to the pixel electrodes of the pixel circuits through the TFTs.

While the interconnect capacitance of a data line is very large in the large-screen and high-resolution display panel, the capacitance of a capacitance element in one pixel circuit is sufficiently smaller than this. For this reason, even if supply of the gray scale signal from the data line to the pixel electrode is continued from the timing T2 to the timing Ta 23 or from the timing T3 to the timing Ta34, the held gray scale signal voltage will not be changed. On the other hand, the voltage at the pixel electrode can continue changing to the target gray scale signal voltage.

That is, a time for supplying the gray scale signal voltage from the data line to the pixel electrode is the same as that in the conventional driving method described with reference to FIG. 16.

Accordingly, in the present embodiment, an action comparable to improvement of the slew rate of the voltage waveform WA can be implemented among the voltage waveform WA at the data line near end, voltage waveform WB at the data line far end, and voltage waveform WC at the pixel electrode described with reference to FIG. 13. This can achieve higher-speed driving and lower power consumption.

As described above, even if the present embodiment is configured to include the positive polarity operational amplifiers 901, negative polarity operational amplifiers 902, and switches Spa, Spb, Sna, and Snb as shown in FIG. 3, the delay control circuit 115 and the output switch control circuit 116 are interlocked. Then, by delaying the scan cycle by the predetermined time with respect to the output cycle as shown in FIG. 4, the same action and effect as that in the first embodiment in FIG. 1 can be obtained.

Incidentally, referring to FIG. 3, the noise compensation circuit may be of course provided at a connection node between the output switch circuit 114 and each of the data lines.

Third Embodiment

Figure 5:
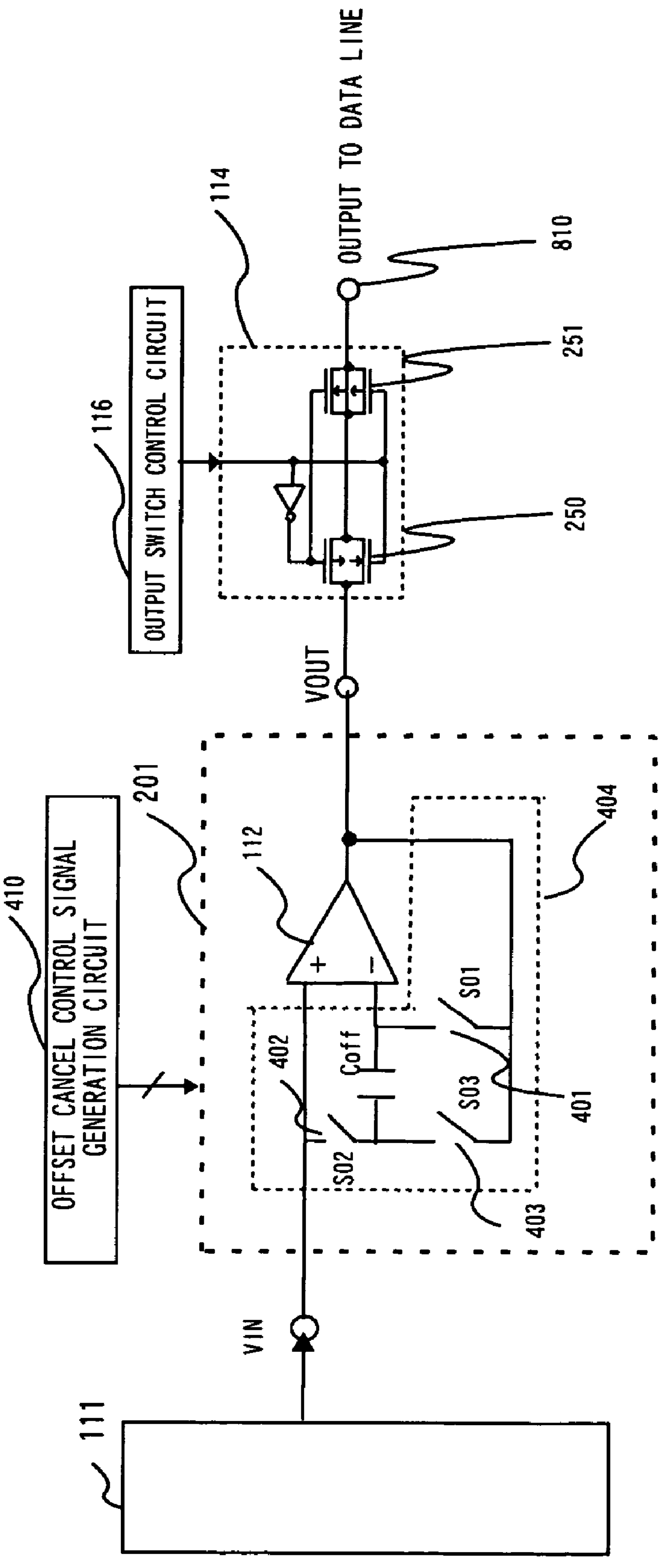
FIG. 5 is a diagram showing a general configuration of an active matrix type display device that uses an amplifier having an offset canceling function as a third embodiment of the present invention.

A configuration of a third embodiment of the present invention will be described below. FIG. 5 is a diagram showing a configuration of an active matrix type liquid crystal display device according to the third embodiment of the present invention. Referring to FIG. 5, a difference between the present embodiment and the first embodiment described before, shown in FIG. 1 is that an operational amplifier having an offset cancelling function is used for each of the buffer amplifiers 201.

Figure 7:
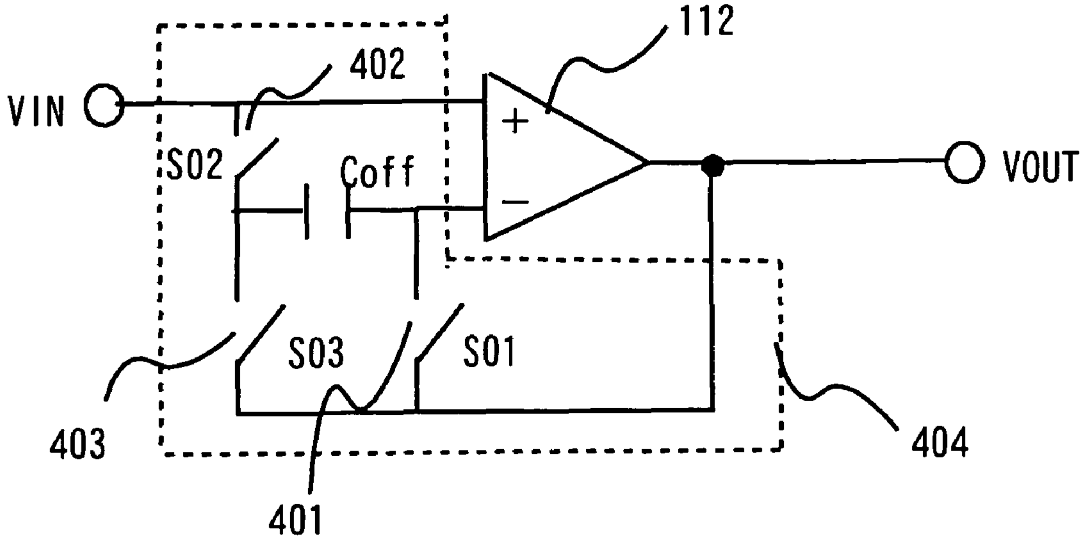
FIG. 7 is a diagram showing an example of a configuration of an operational amplifier having an offset cancelling function.

As the operational amplifier having the offset canceling function used in the configuration shown in FIG. 5, a configuration as shown in FIG. 7, for example, is employed. FIG. 7 is a diagram showing the configuration of an operational amplifier disclosed in Patent Document 9 (Japanese Patent Kokai Publication No. JP-A-9-244590). Other configuration can be similarly used, if it is the operational amplifier having the offset cancelling function. Since a configuration of the liquid crystal panel 101 is the same as that in FIG. 1, a description about the configuration of the liquid crystal panel 101 in the present embodiment will be omitted, so that a diagram showing the configuration for performing one output will be shown.

Referring to FIG. 7, the amplifier having the offset canceling function includes the operational amplifier 112 and an offset compensation circuit 404. The offset compensation circuit 404 includes an offset detection capacitance Coff and switches 401 to 403 to be controlled by control signals S01 to S03, respectively. An input voltage VIN to the operational amplifier 112 is input to a non-inverting input terminal (+) of the operational amplifier 112. An output voltage VOUT from the operational amplifier 112 is output to an outside.

The switches 402 and 403 are connected in series between the non-inverting input terminal (+) of the operational amplifier 112 and an output terminal of the operational amplifier 112. The offset detection capacitance Coff is connected between a connection node between the switches 402 and 403 and an inverting input terminal (−) of the operational amplifier 112. The switch 401 is connected between the inverting input terminal (−) of the operational amplifier 112 and the output terminal of the operational amplifier 112.

Figure 8:
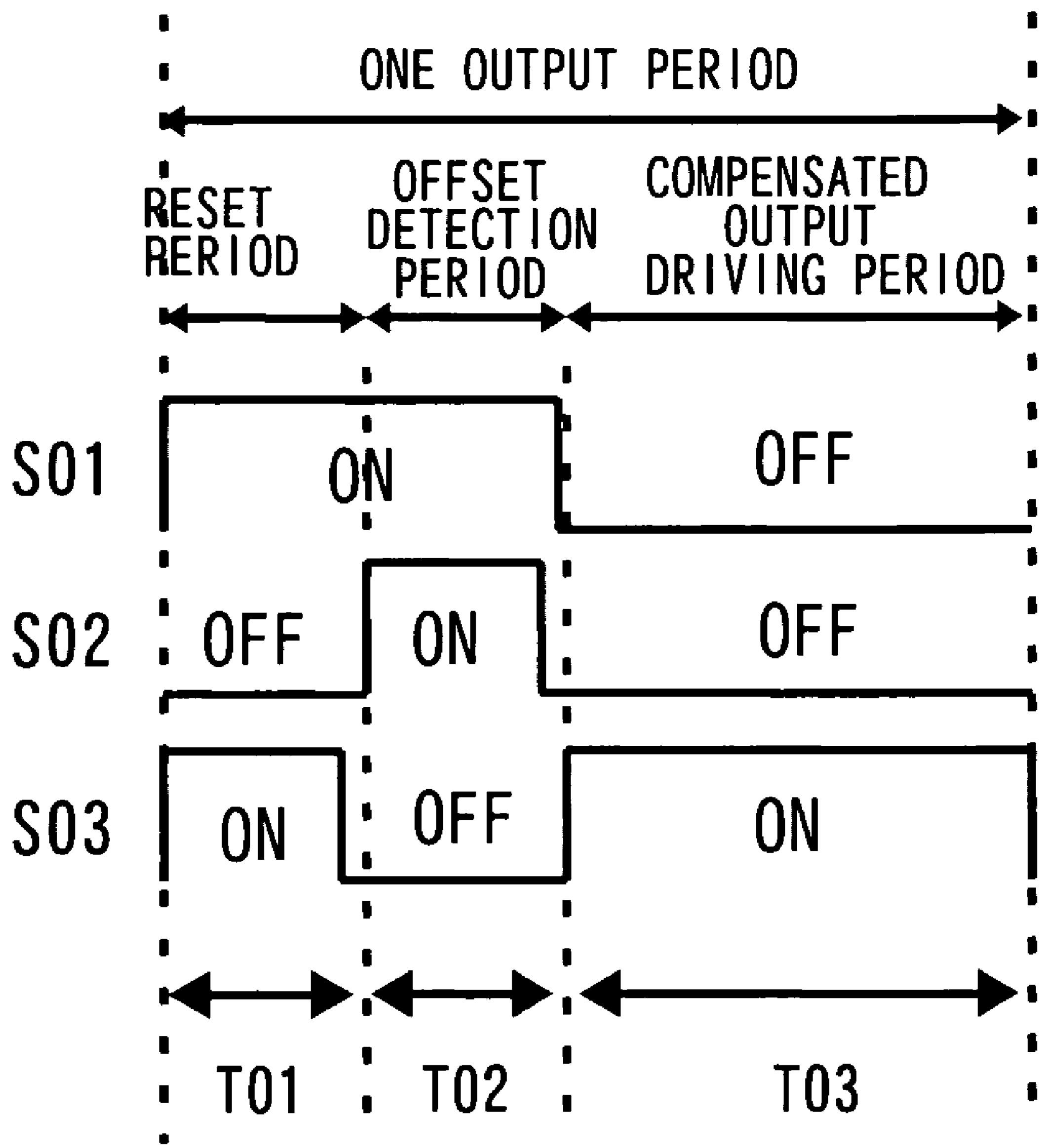
FIG. 8 is a timing chart diagram showing a driving method about FIG. 7.

Next, an operation of the operational amplifier having the offset canceling function, described with reference to FIG. 7 will be described using a timing chart in FIG. 8. Referring to FIG. 8, reference characters S01, S02 and S03 correspond to the switch 401, 402 and 403 in FIG. 7, respectively.

First, in a period T01, the switches S01 and S03 are both turned on, and the switch S02 is turned off. This causes both ends of the capacitance Coff in FIG. 7 to be short-circuited, thereby having the same potentials. Further, by causing the switches S01 and S02 in FIG. 7 to be both turned on, the potentials at both ends of the capacitance Coff both change according to an output Vout of the operational amplifier 112 and becomes:

Vin+Voff, where Voff is an offset voltage (in the reset period).

In a period T02, the switch S03 is turned off with the switch S01 kept turned on. Then, the switch S02 is turned on. This causes one end of the capacitance Coff connected to an input terminal, and the potential thereof changes from the output voltage Vout to the input voltage Vin.

Since the switch S01 is in an on state, the potential at the other end of the capacitance Coff maintains the output voltage Vout. Accordingly, a voltage to be applied to the capacitance Coff becomes as follows:

$$\begin{aligned} Vout - Vin &= Vin + Voff - Vin \\ &= Voff \end{aligned}$$

Thus, electric charges comparable to the offset voltage Voff are charged to the capacitance Coff (in an offset detection period).

During a period T03, the switches S01 and S02 are both turned off. Then, the switch S03 is turned on. By turning off both of the switches S01 and S02, the capacitance Coff is directly connected between the inverting input terminal of the operational amplifier 112 and the output terminal of the operational amplifier 112. The offset voltage Voff is held in the capacitance Coff.

By turning on the switch S03, the offset voltage Voff is superimposed for application to the inverting input terminal of the operational amplifier 112 using a potential at the output terminal as a reference. As a result, the output voltage Vout becomes as follows:

$$\begin{aligned} Vout &= Vin + Voff - Voff \\ &= Vin \end{aligned}$$

Thus, cancellation of the offset voltage is performed, so that a high-accuracy voltage can be outputted (in a compensated output driving period).

The offset canceling amplifier as described above is disclosed in Patent Document 9. The reset period and the offset detection period become the period for preparing for offset cancellation.

In an operation of the offset cancellation described above, the reset period (T01) is provided. The reset period, however, may be omitted. When the reset period is provided, resetting is performed by equalizing the potentials at both ends of the capacitance Coff of the offset canceling amplifier. Thus, a period of charging (discharging) the offset voltage can be reduced, and an input capacitance of the offset canceling amplifier can be reduced.

Accordingly, means for providing the reset period is effective means in case wherein capability of an input power supply of supplying electric charges is small.

Next, an operation and an action of the present embodiment (refer to FIG. 5) using the offset canceling amplifier shown in FIG. 7 will be described. FIG. 5 is a diagram showing a configuration of a column driver for performing one output in the present embodiment using the amplifier having the offset canceling function.

Referring to FIG. 5, the amplifier having the offset canceling function in FIG. 7 constitutes a buffer amplifier 201. The input terminal VIN of the buffer amplifier 201 is connected to an output of the preceding-stage circuit unit 111. The output terminal VOUT of the buffer amplifier is connected to an input of the output switch circuit 114, and an output of the output switch circuit 114 is connected to a data line.

A control signal generated by an offset canceling control signal generation circuit 410 is input to the buffer amplifier 201, and on/off control over the switches S01 to S03 is performed. The offset canceling control signal generation circuit 410 may perform signal generation within the column driver, or a signal generated in a control circuit in the outside may be input to the buffer amplifier 201.

Each output switch circuit 114 is constituted from the switch 250 and the switching noise compensation circuit 251, and control over an operation of the output switch circuit 114 is performed based on each control signal generated from the output switch control circuit 116. Details are the same as those described before in the first embodiment. Timings of the operation for driving the liquid crystal display device including the column driver in FIG. 5 are set to be the operation timings that are the same as those shown in FIG. 2.

Specific values for the time TH for the one horizontal period 1H, time TD during which the switch is turned off, control timings T1 to T3, and the like are determined within a range in which the display device can be operated, depending on the liquid crystal panel 101 in FIG. 1.

In the third embodiment of the present invention, the operation of the offset cancellation is performed. Thus, a timing chart showing a combination of the output switch signal timings in the timing chart for the liquid crystal display device in FIG. 2 and switch timings of the offset canceling control signal will be shown in FIG. 6.

Figure 6:
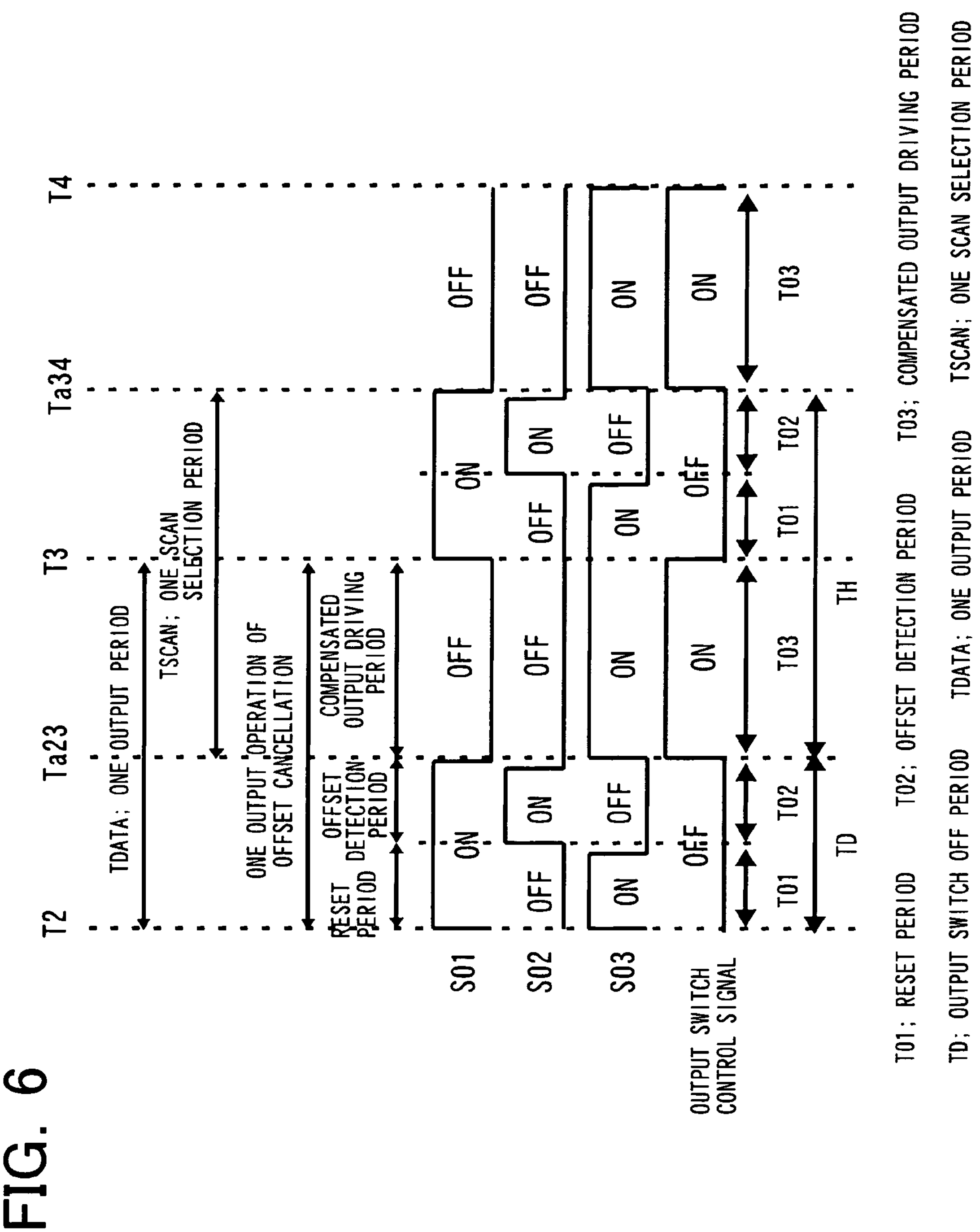
FIG. 6 is a timing chart diagram showing a driving method about FIG. 5.

Timings T2, Ta23, T3, Ta34, and T4 in FIG. 6 denote the same as those indicated by same reference characters in FIG. 2. An operation of the present embodiment will be described with reference to the diagram of the timing chart in FIG. 6.

During a time period from the timing T2 to the timing Ta23 (during the time period TD), the output switch 250 is turned off, so that the data line holds the gray scale signal voltage immediately before the output switch 250 is turned off. During this time period, the offset compensating circuit 404 in the buffer amplifier 201 equalizes the potentials at both ends of the capacitance Coff during the period T01, for resetting. During the time period T02, the offset compensating circuit 404 charges the offset voltage Voff to both ends of the capacitance Coff.

During this time period T02, the output switch 250 is turned off. Thus, the buffer amplifier 201 and the data line operate independently. That is, while the buffer amplifier 201 performs the operation of detecting an offset caused by variations in transistor characteristics of the operational amplifier 112 based on the gray scale signal corresponding to the video data DATA (x+1), the data line holds the gray scale signal corresponding to the video data DATA (x). Supply of electric charges to pixels is performed according to the voltage of the gray scale signal.

During a time period from the timing Ta23 to the timing T3 (or during the period T03), the output switch 250 is turned on, and a voltage at a near end of a data line load instantaneously changes according to a voltage at the output terminal of the buffer amplifier 201. At this point, as the voltage output to the data line, the gray scale signal voltage corresponding to the video data DATA (x+1) for which the offset voltage has been compensated by the offset compensation circuit 404 in the buffer amplifier 201 is output.

During a time period from the timing T3 to the timing Ta34, the output switch 250 is turned off, and the gray scale signal voltage corresponding to the video data DATA (x+1) for which the offset voltage has been compensated is held on the data line. During this time period, supply of electric charges to pixels is performed according to the voltage held on the data line.

A time period from the timing Ta23 to the timing Ta34 corresponds to the one scan selection period (TSCAN).

As described before, in the present invention, the amplifier having the offset canceling function can be used. According to the present embodiment, the same effect as that in the first embodiment in FIG. 1 can be achieved. High output accuracy can be thereby implemented.

In the present embodiment, an offset preparation period (the reset period and the offset detection period) is arranged in a period that overlaps with the period in which the output switch is turned off. This can eliminate the shortage of time for supplying electric charges to a pixel electrode, caused by insertion of the offset preparation period.

In conventional control, it is necessary to shorten a time period, for driving a data line by the offset preparation period. As a result, the time for supplying electric charges to pixels would become insufficient.

In the present invention, an amplifier having the offset canceling function can obtain the same effect by the same control, if it is a circuit having a function of compensating for an offset.

Fourth Embodiment

Figure 9:
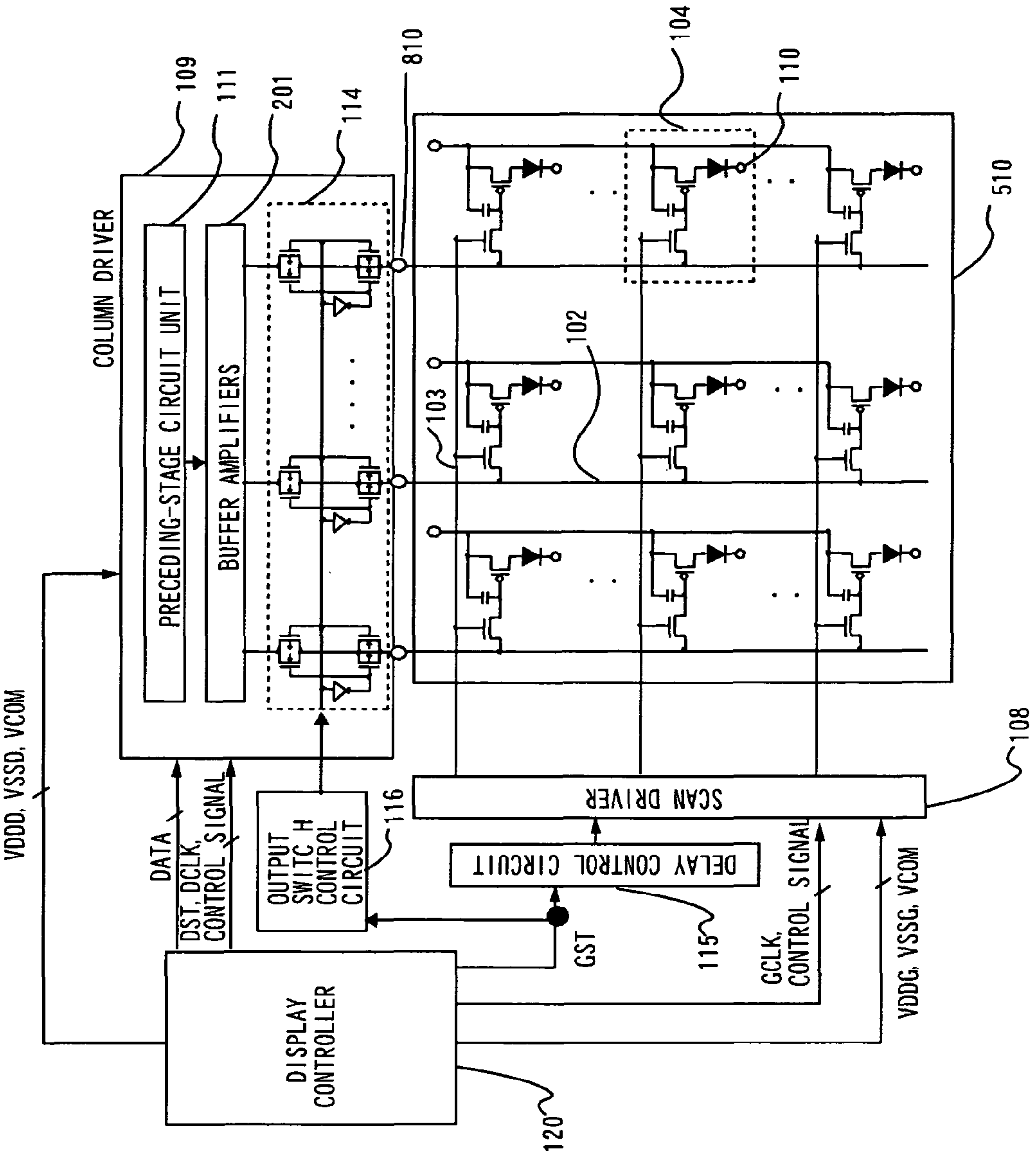
FIG. 9 shows an organic EL display device in a case where a pixel circuit in FIG. 11 has been applied to the display device in FIG. 1 as a fourth embodiment of the present invention.

A configuration of a fourth embodiment of the present invention will be described below. FIG. 9 shows an active matrix type organic EL (ElectroLuminescence) display device of a voltage driving type according to the fourth embodiment in which the gray scale signal voltage is supplied to a pixel, thereby controlling light emission of an organic EL element.

Figure 11:
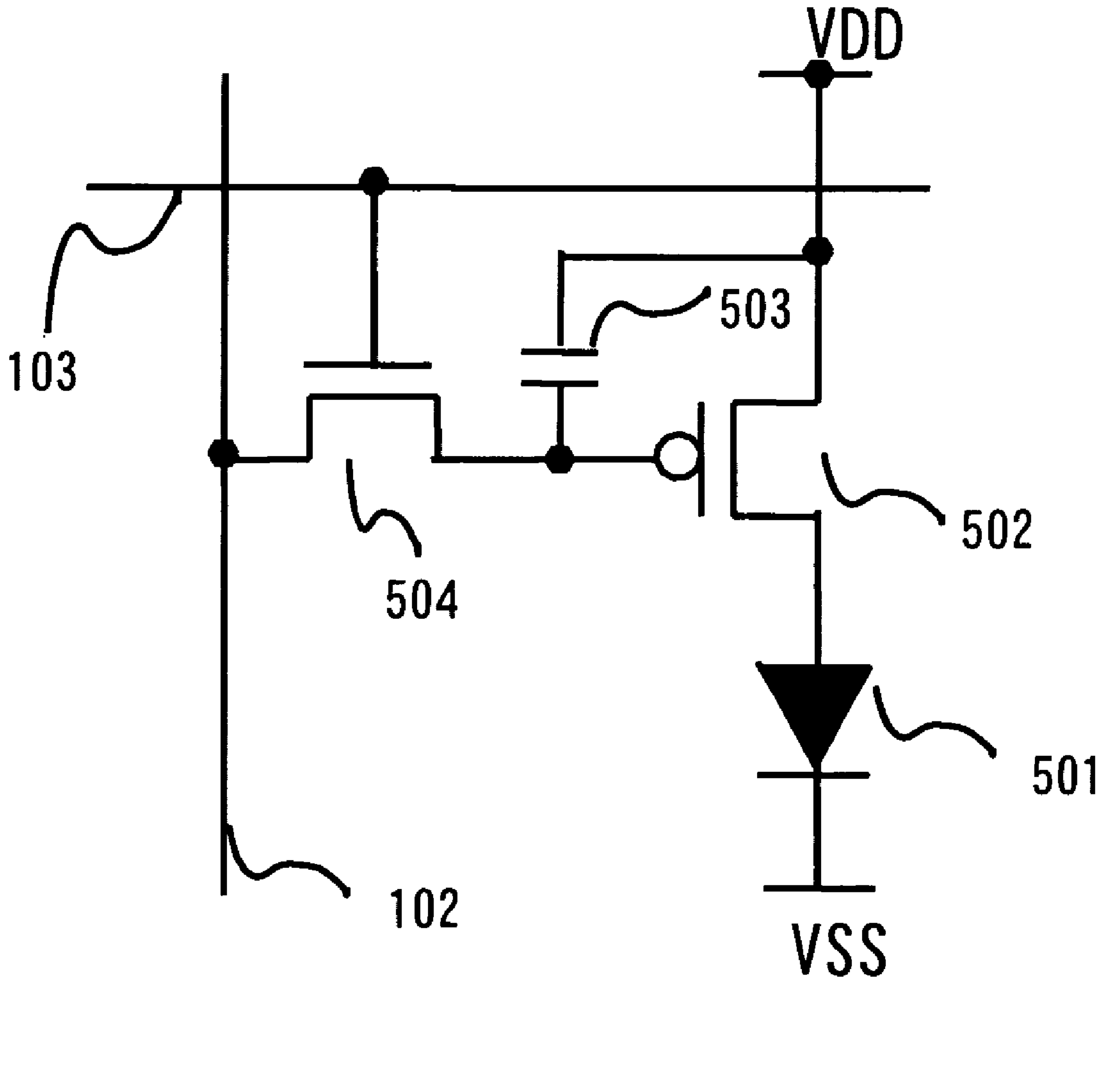
FIG. 11 is a diagram showing a configuration of a pixel circuit that uses an organic EL element.

FIG. 11 is a diagram showing one pixel circuit of organic EL. Referring to FIG. 11, this pixel circuit is located at an intersection between a scan line 103 and a data line 102, and includes a switching transistor 504, a holding capacitance 503, a driving transistor 502, and an EL element 501.

In order to supply the gray scale signal supplied from the data line 102 to a display element, a drain of the switching transistor 504 is connected to the data line 102, a source of the switching transistor 504 is connected to the driving transistor 502, and a gate of the switching transistor 504 is connected to the scan line 103.

In order to be driven by a voltage held in the holding capacitance 503 connected between a power supply VDD and the source of the switching transistor 504, a source of the driving transistor 502 is connected to the power supply VDD, a drain of the driving transistor 502 is connected to one end of the EL element 501, and a gate of the driving transistor 502 is connected to the source of the switching transistor 504.

In order to change a brightness level of the light emission according to a current flown by the driving transistor 502, one end of the EL element 501 is connected to the drain of the driving transistor 502, and the other end of the EL element 501 is connected to a VSS fixed potential.

An operation of the organic EL pixel circuit shown in FIG. 11 will be described. By raising the scan line 103 to a HIGH level, the switching transistor 504 is turned on. A voltage at the data line 102 is then applied to the holding capacitance 503, so that the driving transistor 502 is turned on.

A current in accordance with electric conductivity determined by a gate-to-source voltage of the driving transistor 502 flows through the EL element 501. That is, according to the voltage at the data line 102, control over gray scale display is performed in an analog manner using transistor characteristics.

Referring to FIG. 9, the organic EL display device according to the fourth embodiment of the present invention includes the scan driver 108, delay control circuit 115, column driver 109, output switch control circuit 116, an EL display panel 501, and display controller (control circuit) 120. Connecting relationships between respective blocks are the same as those in the configuration shown in FIG. 1.

Figure 10:
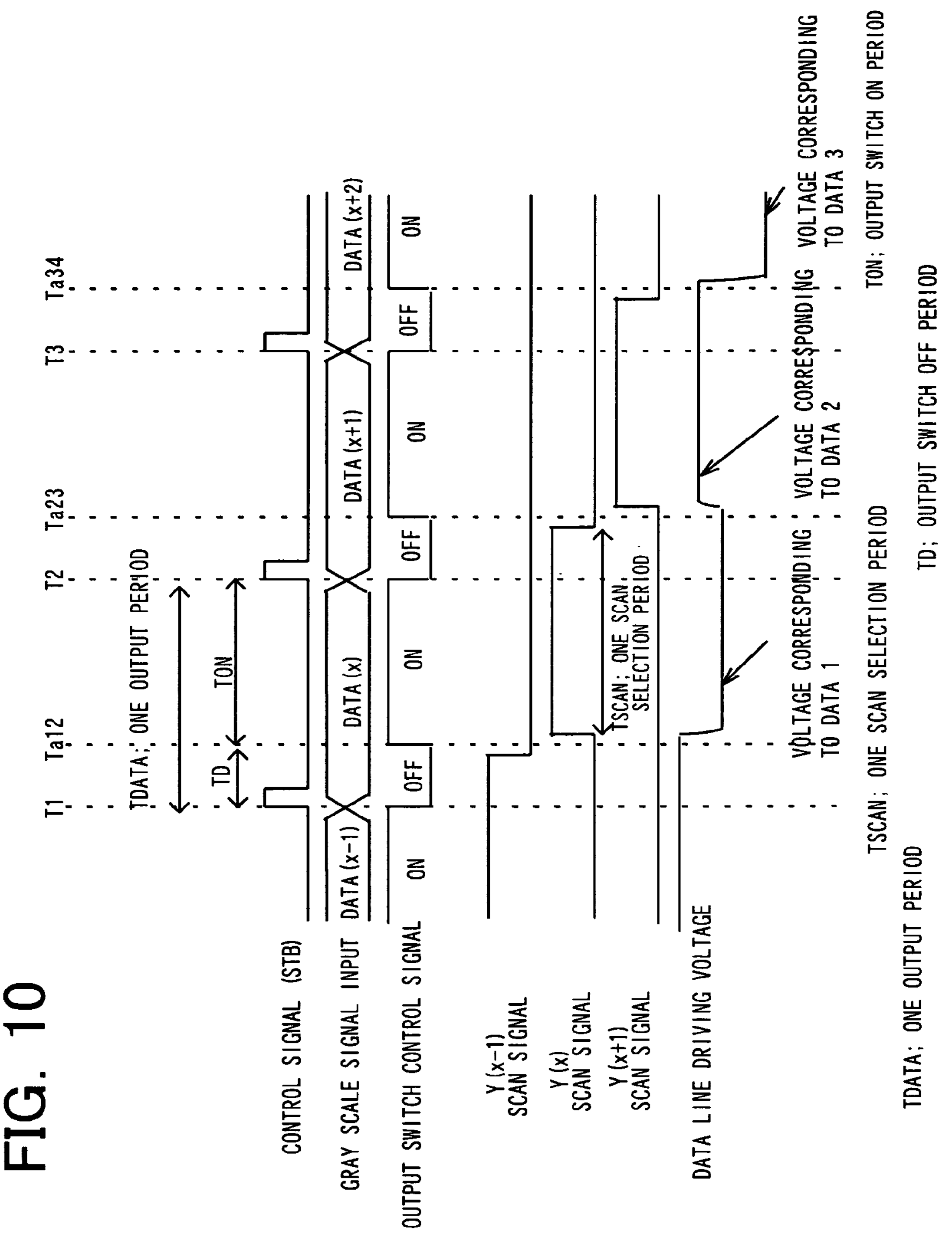
FIG. 10 is a timing chart diagram showing a driving method about FIG. 9.

FIG. 10 is a timing chart diagram showing driving signal waveforms in FIG. 9. FIG. 10 shows the same operation timings as those in FIG. 2. The output switch circuit 114 is operated based on the output switch control signal generated at the output switch control circuit 116. Then, during a period of the time TD [μsec] from a time when the input of the gray scale signal to the buffer amplifier 201 is changed, the output switch 114 is turned off. Otherwise, the output switch 114 is turned on. During the period when the output switch circuit 114 is set in an off state by the output switch control signal, the operational amplifier of the buffer amplifier 201 and the data line are shut down. In other periods, the output terminal of the buffer amplifier is connected to the corresponding data line.

In the organic EL display device, polarity inversion driving is not performed, and the EL element is employed as a current-driven display element. Thus, the data line driving voltage shown in FIG. 12 is the voltage having no polarity and has a one-to-one correspondence with a gray scale.

The data line driving voltage is applied to the holding capacitance, and a signal is applied to the gate of the driving transistor 502 in FIG. 11. The current that flows through the EL element is thereby controlled to obtain a desired brightness level.

As described before, in the present embodiment, the output switch circuit 114 is provided for the buffer amplifier that uses the conventional operational amplifier. By phase control of the scan signal and control over the output switch circuit 114, high-speed driving is implemented. A shortage of supplying electric charges to the holding capacitance of the pixel circuit can be thereby suppressed.

Further, as measures for preventing the shortage of supplying electric charges to a pixel, an increase in the slew rate is not performed in particular. Accordingly, lower power consumption can be achieved.

Further, the output switch circuit 114 includes the switching noise compensation circuit. Thus, the noise caused by the injection of electric charges to the channel when the switch is turned off or the clock field slew can be removed. The gray scale signal voltage can be held on the data line without the influence of the noise.

In the present embodiment, other configuration can be employed as the configuration of the pixel circuit if it has a capacitance for holding the gray scale signal voltage and it is of a voltage driving type in which light emission of the organic EL element is controlled according to the magnitude of the voltage held by the capacitance.

The foregoing description about the conventional art was given about the liquid crystal display device and the organic EL display device in particular. The configuration is not limited to these. The same effect can be obtained from any display device including the scan lines, data lines, and pixel display elements (display element or TFTs) provided at intersections therebetween, and including a circuit for driving those.

EXAMPLE

First Example

A configuration and an effect of an embodiment of the present invention will be described in detail using drawings. As a first example of the embodiment of the present invention, in an example of the configuration of a liquid crystal display device, the effect of the present invention will be described together with specific figures. The configuration of the liquid crystal display device is set to be the same as that in FIG. 1, and the resolution of the liquid panels is set to conform to an EGA (eXtended Graphics Array with 768 vertical pixels and 1024 horizontal pixels). A frame frequency is set to 60 Hz. Accordingly, the total number of the scan lines is 768 (with M of Y(M) being 768), and the total number of the data lines is 3072, because the data lines are necessary for respective RGB (red, green, and blue) (with N in X(N) being 3072). Each output switch circuit 114 includes the switching noise compensation (transistor) circuit. One horizontal period (1H) becomes approximately 20 μs (TH=20 μs). In an actual large-screen panel, 1H is approximately 10 to 20 μs.

A timing chart diagram of driving signals in this embodiment is the same as that in FIG. 2. The period during which the output switch is set in an off state is set to 5 μs (TD=5 μs). It is assumed in this embodiment that the data line load is 60 pF, 60 kΩ.

FIGS. 12A and 12B show simulation results in this embodiment, and is provided for specifically showing the effect of the present invention. FIG. 12A shows a waveform of the data line driving voltage at the near end of the load, while FIG. 12B shows a waveform of the data line driving voltage at the far end of the load.

A waveform 2A in FIG. 12A shows the output voltage of the operational amplifier in the present invention. A waveform 2B in FIG. 12A shows the data line driving voltage at the near end of the load in the present invention. A waveform 1B shows a data line driving voltage at the near end of the load driven by the conventional driving method as a comparative example for the present invention.

Referring to FIG. 12B, a waveform 2C is the data line driving voltage at the far end of the load in the present invention. A waveform IC shows a data line driving voltage at the far end of the load driven by the conventional driving method as the comparative example for the present invention.

It is assumed that referring to FIGS. 12A and 12B, timings T2, Ta23, T3, and Ta34 indicate timings at the same locations as those in FIG. 2. FIGS. 12A and 12B, however, show the data line driving voltage waveforms 1B and 1C obtained by the conventional driving method, delayed just by the time TD, for convenience.

That is, the conventional waveforms 1B and 1C originally rise at the timing T2 and fall at the timing T3. However, for comparisons with the present invention (or the comparison between the waveform 2B and the waveform 1B, and the comparison between the waveform 2C and the waveform 1C), coincidence of the starting times of one scan selection period is made, for display.

The timings will be sequentially described below, with reference to FIGS. 2 and 12.

Referring to FIG. 2, the timings T2 and T3 indicate the respective timings when the input of the gray scale signal to the buffer amplifier 201 is changed. The timings Ta23 and Ta34 indicate the respective timings when the scan signal is switched for selection of the next scan line (the timings at which the one horizontal period is started).

Referring to FIG. 2, the output switch circuit 114 is set in an off state from the timing T2 to the timing Ta23. During this period, the output terminal of each operational amplifier 112 for the buffer amplifier 201 changes an output potential according to a voltage signal output from the preceding-stage circuit unit 111.

Figure 17:
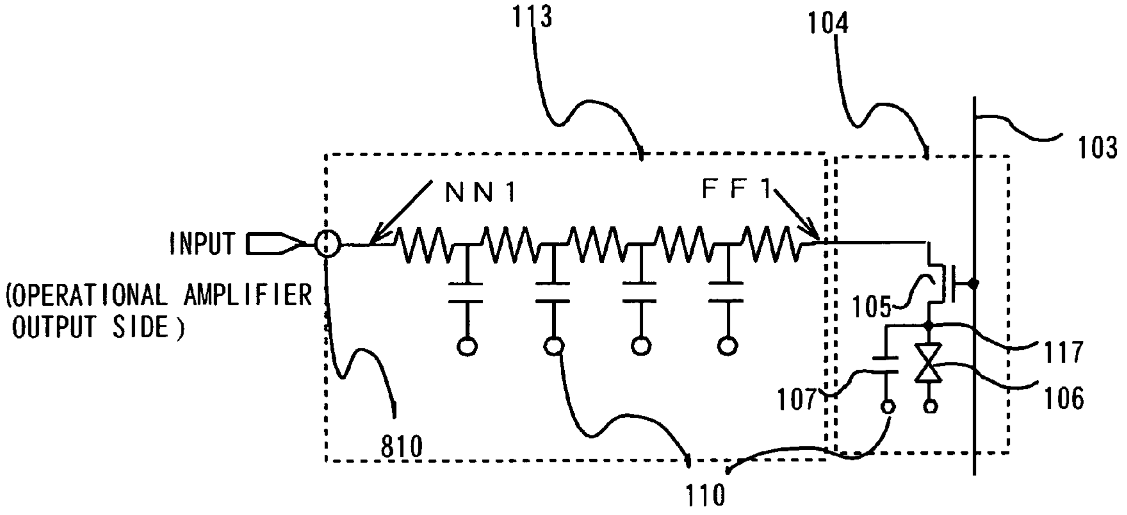
FIG. 17 is a diagram showing an equivalent circuit for a data line.
Figure 18:
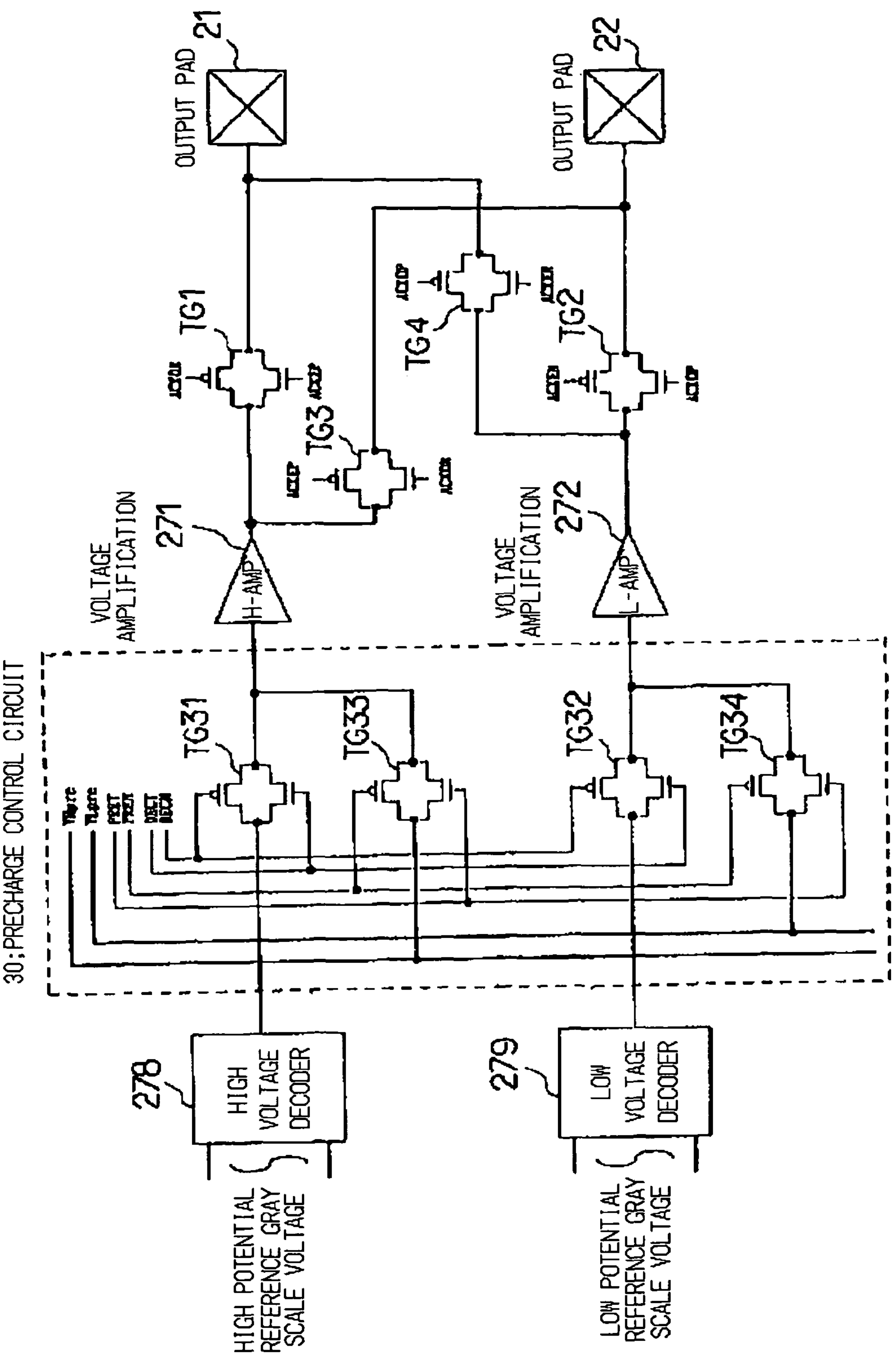
FIG. 18 is a block diagram showing a configuration of a column driver described in Patent Document 1 (Japanese Patent Kokai Publication No. JP-P2001-22328A)
Figure 19:
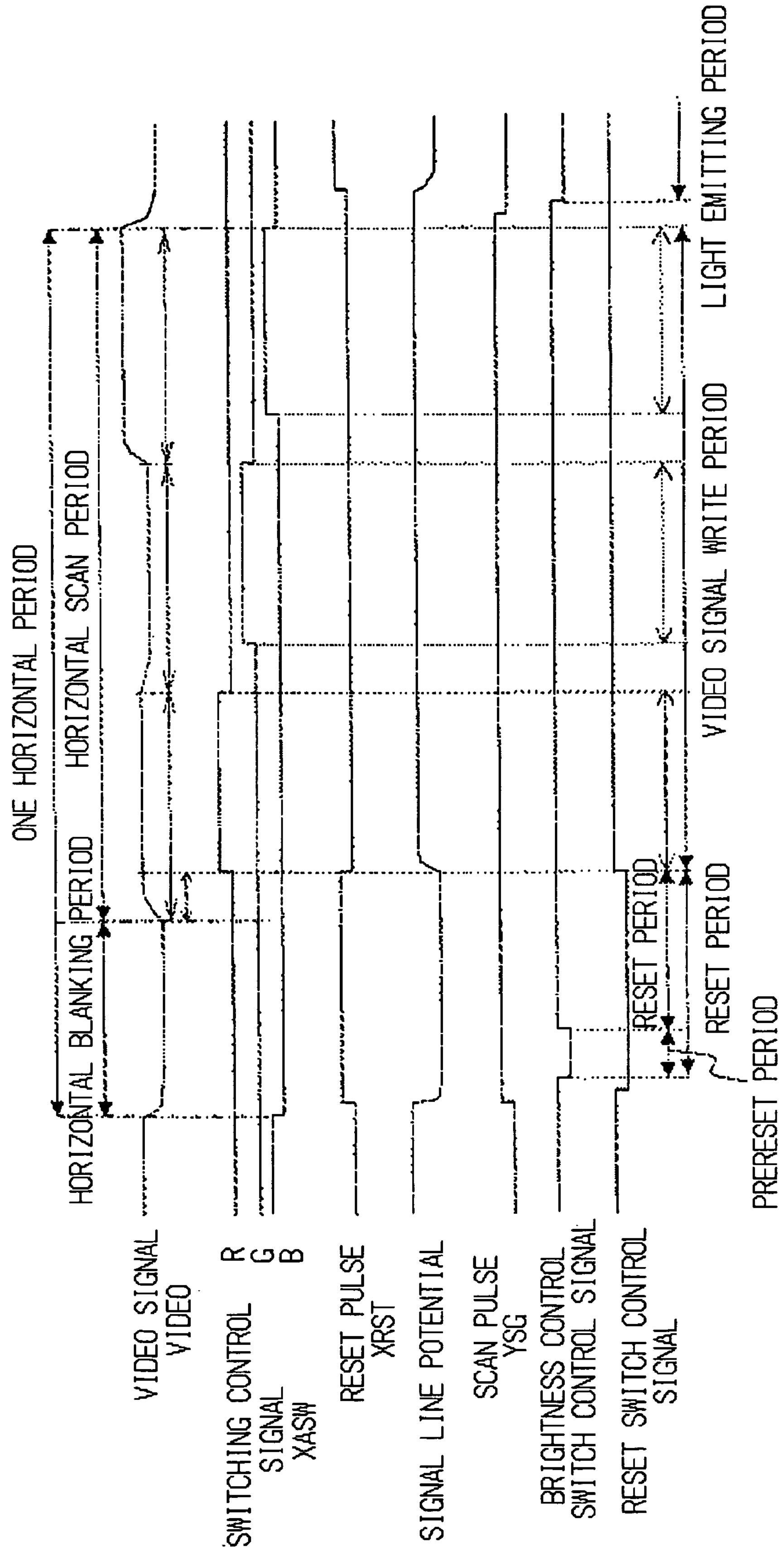
FIG. 19 is a timing chart diagram showing control over respective units of an organic EL display panel described in Patent Document 2 (Japanese Patent Kokai Publication No. JP-P2004-61970A).

On the other hand, the data line driving voltage waveform 2B (of a voltage at the terminal NN1 in FIG. 17) holds a voltage (of 3V) immediately before the output switch circuit 114 is turned off. It is because the buffer amplifier 201 and the data line are shut down.

The switch 250 in the output switch circuit 114 is turned on and from the timing Ta23 to the timing T3. During this period, the waveform 2B is instantaneously changed to the next voltage (of 7V). This is because, as shown in the waveform 2A, the output voltage of the operational amplifier 112 is stabilized at a certain voltage (7V) at the timing Ta23, and the output terminal of the buffer amplifier 201 is connected with the near end of the load at the same time when the switch 250 is turned on. On the other hand, the voltage of the data line driving voltage waveform 1B in the conventional driving method is gently changed according to the slew rate of the operational amplifier.

The output switch circuit 114 is turned off from the timing T3 to the timing Ta34. During this period, the data line driving voltage waveform 2B holds the voltage (of 7V) immediately before the output switch circuit 114 is turned off. Further, during this period, the TFTs selected by the scan signal are turned on, and supply of electric charges to the pixels is continued by the electric charges held on the data line. The reason why the data line driving voltage waveform is hardly changed is that the capacitance of the data line load is sufficiently large.

For this reason, even if the output switch circuit 114 is turned off, the period of supplying the electric charges to the pixels (the period of the scan signal H) is comparable to that implemented by a conventional technique.

When the waveforms 2B and 1B in FIG. 12A are compared, the effect of the present invention is obvious at a glance.

The data line driving voltage at the near end of the load is instantaneously changed to a desired voltage by driving according to the present invention, which shows that the high-speed driving can be implemented.

The data line driving voltage at the far end of the load is changed by relaxation of electric charges according to the voltage at the near end of the load. As clear from the comparison between the waveform 2C and the waveform 1C in FIG. 12B, a driving speed is naturally improved at the far end of the load as well.

As described before, by phase control of the scan signal and control over the output switch, high-speed driving is implemented by instantaneously changing the voltage at the near end of the load. A shortage of supplying electric charges to the pixels can be thereby prevented.

Further, according to the present invention, as measures for preventing the shortage of supplying electric charges to the pixels, an increase in the slew rate of the amplifier caused by an increase in current consumption of the amplifier does not need to be performed in particular. Accordingly, lower power consumption than that obtained by the conventional method using the comparable slew rate can be achieved.

Further, the output switch circuit 114 further includes the switching noise compensation circuit 251. The noise generated by injection of electric charges to the channel or the clock feed slew when the switch 250 of the output switch circuit 114 is turned off can be thereby removed. The voltage of the gray scale signal can be thereby held without being influenced by the noise.

The foregoing description was made about examples of the embodiments of the present invention and the specific embodiments of the present invention. Incidentally, the present invention is not limited to the configurations of the embodiments described above and of course includes various variations and modifications that could be made by those who are skilled in the art within the scope of the present invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An active matrix type display device comprising:
- a display unit including:
  - a plurality of data lines extending parallel to one another in one direction;
  - a plurality of scan lines extending parallel to one another in a direction orthogonal to said one direction;
  - a plurality of pixel electrodes arranged in a matrix pattern at points of intersection of said data lines and said scan lines; and
  - a plurality of thin film transistors (TFTs) provided in a one-to-one relationship with respect to said plurality of pixel electrodes, each transistor having one of a drain and a source connected to a corresponding one of said pixel electrodes, the other one of the drain and the source connected to a corresponding one of said data lines, and a gate connected to a corresponding one of said scan lines;
- a scan driver for supplying a scan signal to each of said scan lines in a preset scan cycle;
- a column driver including:
  - digital-to-analog converter units for converting video data to gray scale signals;
  - a plurality of buffer amplifiers for sequentially amplifying and outputting the gray scale signals in a preset output cycle; and
  - an output switch circuit comprising a plurality of switches for controlling connection between output terminals of said buffer amplifiers and a first end of said data lines;
- a delay control circuit for controlling said scan driver so that a scan selection period of the preset scan cycle is delayed by a preset delay time for a corresponding output period of the preset output cycle;
- an output switch control circuit for controlling said output switch circuit to be kept off during the preset delay time; and
- a display controller for controlling the video data, said scan driver, said column driver, said delay control circuit, and said output switch control circuit,
- wherein the scan selection period delayed by the delay control circuit extends beyond the corresponding output period of the preset output cycle and the scan selection period overlaps with an output period succeeding the corresponding output period of the preset output cycle.

2. The active matrix type display device according to claim 1, further comprising:

a plurality of switching noise compensation circuits connected to said one ends of said data lines, respectively, said one ends of said data lines being connected to said switches of said output switch circuit.

3. The active matrix type display device according to claim 2, wherein said output switch circuit includes first transistors, constituting said switches, each having a control terminal for receiving a first control signal output from said output switch control circuit, and having a drain and source connected between a corresponding one of said output terminals of said buffer amplifiers and a corresponding one of said one ends of said data lines; and wherein each of said switching noise compensation circuits includes a second transistor of the conductivity type same as that of the first transistor, having a control terminal for receiving an inverted signal of the first control signal, and having a drain and source connected in common to said corresponding one of said one ends of said data lines.

4. The active matrix type display device according to claim 1, wherein the output period of the preset output cycle includes:

a first time period during which said switches of said output switch circuit are set in an off state by said output switch control circuit with said buffer amplifiers made active; and a second time period during which said switches of said output switch circuit are set in an on state by said output switch control circuit with said buffer amplifiers made active.

5. The active matrix type display device according to claim 1, wherein the scan selection period during which one of said scan lines is selected, and voltages at said data lines are supplied to the pixel electrodes through the thin-film transistors connected to the selected one of said scan lines includes:

a first time period during which said switches of said output switch circuit are set in an on state by said output switch control circuit; and a second time period during which said switches of said output switch circuit are set in an off state by said output switch control circuit.

6. The active matrix type display device according to claim 1, wherein the output period of the preset output cycle includes:

a first time period during which said switches of said output switch circuit are set in an off state by said output switch control circuit, with said buffer amplifiers made active; and a second time period during which said switches of said output switch circuit are set in an on state by said output switch control circuit, with said buffer amplifiers made active; and the scan selection period corresponding to the output period is set to be between a start time of the second time period and a completion time of the first time period of a next output period, wherein during the scan selection period, one of said scan lines is selected, and voltages at said data lines are supplied to the pixel electrodes through the thin-film transistors (TFTs) connected to the selected one of said scan lines.

7. The active matrix type display device according to claim 4, wherein said buffer amplifiers each have an offset canceling function, and a preparation period for detecting an offset value and allowing a compensated output is overlapped with the first time period.

8. The active matrix type display device according to claim 1, wherein each of said data lines includes a first data line and a second data line adjacent to the first data line;

each of said buffer amplifiers includes first and second buffer amplifiers;

said output switch circuit includes:

first and second switches provided between the first buffer amplifier and the first data line and between the first buffer amplifier and the second data line, respectively; and third and fourth switches provided between the second buffer amplifier and the first data line and between the second buffer amplifier and the second data line, respectively; and wherein control is performed so that the second and third switches are set in an off state during one output period of the preset output cycle and said first and fourth switches are turned on after having been kept off during the preset delay time from a start of the one output period, and during an output period subsequent to the one output period, the first and fourth switches are set in an off state, and the second and third switches are turned on after having been kept off during the preset delay time from a start of the subsequent output period.

9. The active matrix type display device according to claim 1, wherein at least a same number of said buffer amplifiers and said switches of said output switch circuit as a number of all of said data lines arranged on said display unit are provided, and drive entire data lines simultaneously.

10. The active matrix type display device according to claim 1, wherein a display element of said display unit is a liquid crystal element.

11. The active matrix type display device according to claim 1, wherein a display element of said display unit is an organic EL (Electro Luminescence) element.

12. A method of driving an active matrix type display device, said active matrix type display device having:

a display unit including:

a plurality of data lines extending parallel to one another in one direction;

a plurality of scan lines extending parallel to one another in a direction orthogonal to said one direction;

a plurality of pixel electrodes arranged in a matrix pattern at points of intersection of said data lines and said scan lines; and a plurality of thin film transistors (TFTs) provided in a one-to-one relationship with respect to said plurality of pixel electrodes, each transistor having one of a drain and a source connected to a corresponding one of said pixel electrodes, the other one of the drain and the source connected to a corresponding one of said data lines, and a gate connected to a corresponding one of said scan lines;

a scan driver for supplying a scan signal to each of said scan lines in a preset scan cycle;

a column driver comprising:

digital-to-analog converter units for converting video data to gray scale signals;

a plurality of buffer amplifiers for sequentially amplifying and outputting the gray scale signals in a preset output cycle; and an output switch circuit including a plurality of switches for controlling connection between output terminals of said buffer amplifiers and a first end of said data lines; and a display controller for controlling the video data, said scan driver, and said column driver, respectively; said method comprising the steps of:

delaying a scan selection period of the preset scan cycle from a corresponding output period of the preset output cycle by a preset delay time; and controlling said output switch circuit to be set in an off state during the preset delay time, wherein the delayed scan selection period extends beyond the corresponding output period of the preset output cycle and the scan selection period overlaps with an output period succeeding the corresponding output period of the preset output cycle.

13. The method according to claim 12, wherein said output period of the preset output cycle includes:

a first time period during which said switches of said output switch circuit are set in an off state by said output switch control circuit with said buffer amplifiers made active; and a second time period during which said switches of said output switch circuit are set in an on state by said output switch control circuit with said buffer amplifiers made active.

14. The method according to claim 12, wherein during the scan selection period one of said scan lines is selected, and voltages at said data lines are supplied to the pixel electrodes through the thin-film transistors connected to the selected one of said scan lines, the scan selection period includes:

a first time period during which said switches of said output switch circuit are set in an on state by said output switch control circuit; and a second time period during which said switches of said output switch circuit are set in an off state by said output switch control circuit.

15. The method according to claim 12, wherein the output period of the preset output cycle includes:

a first time period during which said switches of said output switch circuit are set in an off state by said output switch control circuit with said buffer amplifiers made active;

a second time period during which said switches of said output switch circuit are set in an on state by said output switch control circuit with said buffer amplifiers made active; and the scan selection period corresponding to the output period is set to be between a start time of the second time period and a completion time of the first time period of a next one output period, wherein in the scan selection period, one of said scan lines is selected, and voltages at said data lines are supplied to the pixel electrodes through the thin-film transistors (TFTs) connected to the selected one of said scan lines.

16. The method according to claim 12, wherein said buffer amplifiers each have an offset canceling function, and a preparation period for detecting an offset value and allowing a compensated output is overlapped with the first time period.

* * * * *